US012633842B2

(12) United States Patent
Masrur et al.

(10) Patent No.: US 12,633,842 B2
(45) Date of Patent: May 19, 2026

(54) ACTIVE NEUTRAL CONTROL CIRCUIT, INVERTER SYSTEM, AND METHOD

(71) Applicant: Government of the United States, as represented by the Secretary of the Army, Washington, DC (US)

(72) Inventors: Md Abul Masrur, Troy, MI (US); Alexander M. Soles, Brighton, MI (US)

(73) Assignee: GOVERNMENT OF THE UNITED STATES, BY THE SECRETARY OF THE ARMY, Washington, DC (US)

( * ) Notice: Subject to any disclaimer, the term of this patent is extended or adjusted under 35 U.S.C. 154(b) by 197 days.

(21) Appl. No.: 18/613,938

(22) Filed: Mar. 22, 2024

(65) Prior Publication Data
US 2025/0300573 A1    Sep. 25, 2025

(51) Int. Cl.
*H02M 7/483*     (2007.01)
*H02M 1/00*      (2006.01)
*H02M 7/5395*    (2006.01)

(52) U.S. Cl.
CPC ......... *H02M 7/483* (2013.01); *H02M 1/0048* (2021.05); *H02M 7/5395* (2013.01)

(58) Field of Classification Search
CPC ... H02M 7/483; H02M 1/0048; H02M 7/5395
See application file for complete search history.

(56) References Cited

U.S. PATENT DOCUMENTS

| | | | |
|---|---|---|---|
| 5,574,356 A | 11/1996 | Parker | |
| 5,910,892 A * | 6/1999 | Lyons | H02M 7/487 |
| | | | 363/132 |
| 8,362,789 B2 * | 1/2013 | Collins, Jr. | G01R 19/2513 |
| | | | 324/649 |
| 9,755,549 B2 | 9/2017 | Lewis | |
| 9,929,677 B2 | 3/2018 | Eckel | |
| 10,063,161 B2 | 8/2018 | Li et al. | |

(Continued)

OTHER PUBLICATIONS

Adrian Pana, Active Load Balancing in a Three-Phase Network by Reactive Power Compensation, Power Quality Monitoring, Analysis and Enhancement, Sep. 22, 2011, 219-254, InTech.

(Continued)

*Primary Examiner* — Adolf D Berhane
(74) *Attorney, Agent, or Firm* — Christopher H. Bond

(57)          ABSTRACT

An active neutral control circuit that connects to a three-phase AC power output is provided. The circuit includes a resistor bank having the terminals of a first resistor, a second resistor, and a third resistor arranged in a wye configuration and converging to a neutral point, with other terminals of the resistors respectively connected to each of the three phases of the AC power output. The circuit also includes a voltage sensor to measure an AC phase voltage of one phase of the three-phase power output at the neutral point and a controller that generates a PWM signal based on the measured voltage for controlling a single-phase inverter. The AC voltage output from the single-phase inverter is a floating reference voltage for the phase voltages from the three-phase AC power output to balance the phase voltages in instances where the loads of the three-phase AC power output are unbalanced.

18 Claims, 11 Drawing Sheets

(56) References Cited

U.S. PATENT DOCUMENTS

| | | | | |
|---|---|---|---|---|
| 11,063,550 B2 * | 7/2021 | Li | ............................ | H02M 1/12 |
| 2021/0143727 A1 * | 5/2021 | Yamakawa | ............. | H02M 1/14 |

OTHER PUBLICATIONS

A. Bharathi Sankar et al., Development of Active Neutral Point Clamped Multilevel Inverter Fed BLDC Drive Employing FPGA, Indian Journal of Science and Technology, Feb. 2015, 392-399, vol. 8(4).

Zhenghua Zhang, Investigation of an ANPC Inverter in Electrified Vehicles, Master of Science Thesis for Department of Energy and Environment Technology, Chalmers University of Technology, Jun. 2016, 1-48, Gothenburg, Sweden.

Luis Caballero et al., Advantages of AC-AC Power Converters Based on ANPC Topology for Wind Applications, The European Wind Energy Association (EWEA) Abstract, 2015.

Unknown Author, Neutral Connections and Effective Grounding, Advanced Energy White Paper, Mar. 2013, 1-8, ENG-TOV-270-011, Advanced Energy Industries, Inc.

Rick Chen et al., Design and Implementation of a Three-Phase Active T-Type NPC Inverter for Low-Voltage Microgrids, Energy and Power Engineering, Apr. 6, 2017, 9, 70-77, Scientific Research Publishing.

Thangella Shaik et al., A Novel Approach of Active NPC (ANPC) Multi Level Inverters for Fault-Tolerant Operation, International Conference on Innovations in Electrical & Electronics Engineering (ICIEEE-2014), The International Journal of Engineering and Science (IJES), 2014, 52-59, Guru Nanak Institutions, Hyderabad, India.

Q.-C. Zhong et al., H∞ (Infinity) Control of the Neutral Point in Four-Wire Three-Phase DC-AC Converters, IEEE Article, IEEE Transactions on Industrial Electronics, Oct. 2006, 1594-1602, vol. 53, No. 5, IEEE.

Q.-C. Zhong et al., Generating a Neutral Point for 3-Phase 4-Wire DC-AC Converters, Article in IEEE Compatibility in Power Electronics, 2005, Gdynia, Poland, 2005, 126-133, IEEE.

Rajesh Sulluru et al., A Novel Control Scheme for Hybrid Active Neutral Point Clamped Flying Inverter, Article in IJREE—International Journal of Research in Electrical Engineering, Jan. 2017, 6-11, vol. 4, Issue 01, Research Script.

Yang Jiao, High Power High Frequency 3-Level Neutral Point Clamped Power Conversion System, Dissertation for Doctor of Philosophy in Electrical Engineering, Aug. 17, 2015, 1-279, Virginia Polytechnic Institute and State University, Blacksburg, Virginia.

Yashit Tita et al., An Active Line Conditioner to Balance Voltages in a Distributed Generation System, Research Hub—International Multidisciplinary Research Journal (RHIMRJ), May 2015, 1-6, vol. 2, Issue 5.

Ke Ma et al., Modulation Methods for Neutral-Point-Clamped Wind Power Converter Achieving Loss and Thermal Redistribution Under Low-Voltage Ride-Through, IEEE Article in IEEE Transactions on Industrial Electronics, Feb. 2014, 835-845, vol. 61, No. 2, IEEE.

Samir Trivedi et al., Realization of Active Neutral Point Clamp Multilevel Inverter Using SPWM Technique, Article from International Conference on Research and Innovations in Science, Engineering & Technology ICRISET2017, 2017, 181-186, vol. 1, Kalpa Publications in Engineering.

* cited by examiner

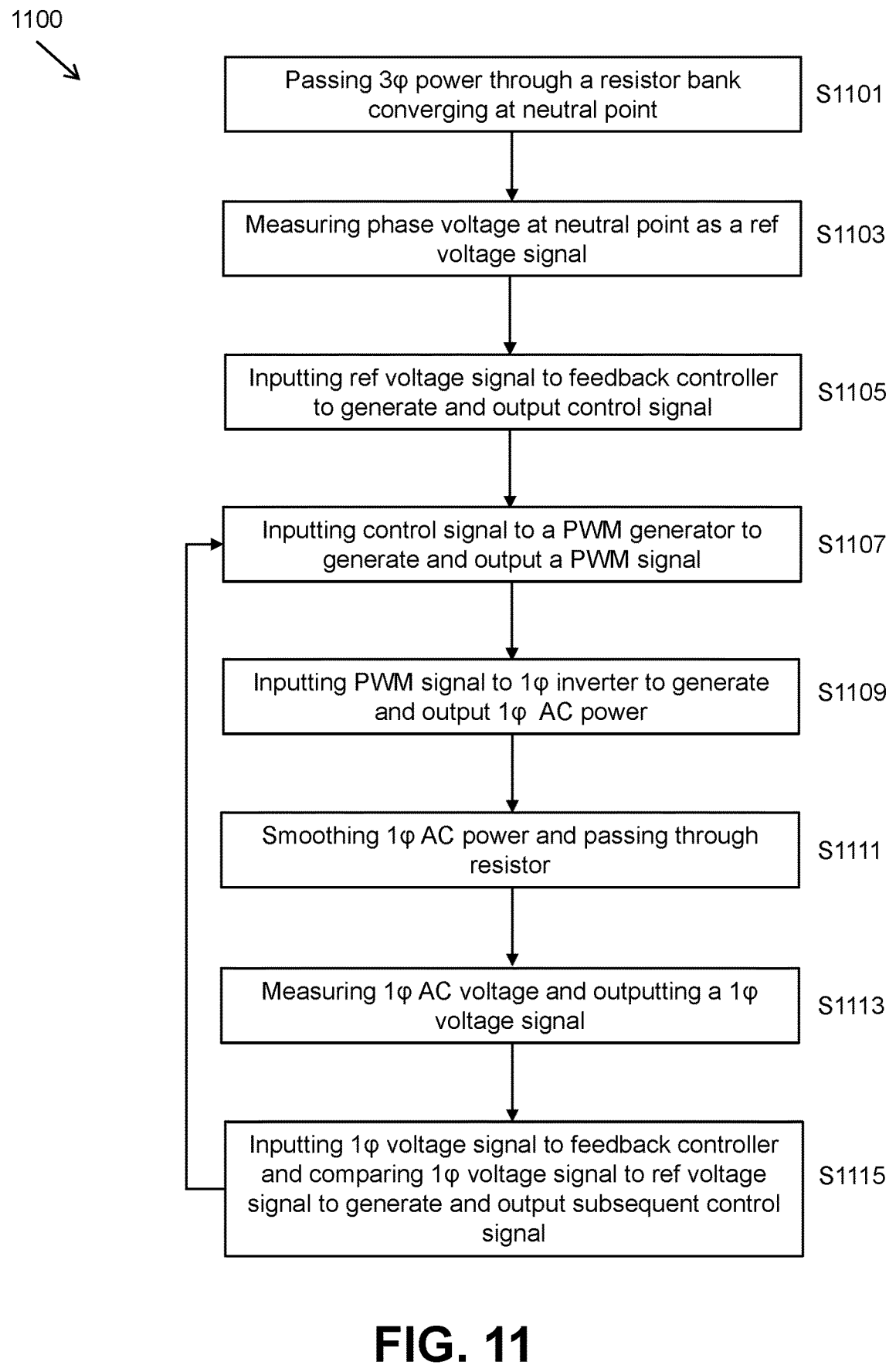

1100

```
       ┌──────────────────────────────────────────┐
       │   Passing 3φ power through a resistor bank │   S1101
       │         converging at neutral point        │
       └──────────────────────────────────────────┘
                         │
                         ▼
       ┌──────────────────────────────────────────┐
       │ Measuring phase voltage at neutral point   │   S1103
       │         as a ref voltage signal            │
       └──────────────────────────────────────────┘
                         │
                         ▼
       ┌──────────────────────────────────────────┐
       │ Inputting ref voltage signal to feedback   │   S1105
       │  controller to generate and output control │
       │                  signal                    │
       └──────────────────────────────────────────┘
                         │
                         ▼
       ┌──────────────────────────────────────────┐
       │  Inputting control signal to a PWM         │   S1107
       │  generator to generate and output a        │
       │             PWM signal                     │
       └──────────────────────────────────────────┘
                         │
                         ▼
       ┌──────────────────────────────────────────┐
       │ Inputting PWM signal to 1φ inverter to     │   S1109
       │   generate and output 1φ AC power          │
       └──────────────────────────────────────────┘
                         │
                         ▼
       ┌──────────────────────────────────────────┐
       │ Smoothing 1φ AC power and passing through  │   S1111
       │                 resistor                   │
       └──────────────────────────────────────────┘
                         │
                         ▼
       ┌──────────────────────────────────────────┐
       │  Measuring 1φ AC voltage and outputting    │   S1113
       │            a 1φ voltage signal             │
       └──────────────────────────────────────────┘
                         │
                         ▼
       ┌──────────────────────────────────────────┐
       │ Inputting 1φ voltage signal to feedback    │   S1115
       │ controller and comparing 1φ voltage signal │
       │  to ref voltage signal to generate and     │
       │      output subsequent control signal      │
       └──────────────────────────────────────────┘
```

FIG. 11

ACTIVE NEUTRAL CONTROL CIRCUIT, INVERTER SYSTEM, AND METHOD

GOVERNMENT INTEREST

The embodiments described herein may be manufactured, used, and/or licensed by or for the Government of the United States of America without payment by the Government of any royalties thereon.

TECHNICAL FIELD

The present disclosure pertains to an active neutral control circuit used with an electronics inverter, a system having an inverter and the active neutral control circuit, and a method of active neutral generation and balancing of phase voltages in a three-phase power output. The inverter is a 5-wire inverter configured to convert a direct current (DC) voltage from a DC power source to an alternating current (AC) voltage and to output balanced three-phase AC power. The 5-wire inverter includes a three-phase power output, a single-phase power output, and a neutral leg (output).

BACKGROUND

The background description provided here is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Direct current (DC) electrical power may be converted to alternating current (AC) electrical power by an inverter. However, such conventional inverters of the related technologies may be limited in function. Accordingly, the conventional inverters for converting DC power to AC power are subject to improvement.

SUMMARY

According to one non-limiting embodiment of the disclosure, an active neutral control circuit is provided. The active neutral control circuit may be configured to connect to a three-phase AC power output having a first phase output, a second phase output, and a third phase output. The active neutral control circuit may include a resistor bank configured to electrically connect to the first phase, second phase, and third phase outputs of the three-phase AC power output. The resistor bank may have a first resistor, a second resistor, and a third resistor converging to a neutral point. Each of the first resistor, the second resistor, and the third resistor may have two terminals. One terminal of each of the first, second, and third resistors may be configured to connect to a different one of the phase outputs of the three-phase AC power output. The other terminals of the first, second, and third resistors may be connected together to form the neutral point. The active neutral control circuit may also include a first voltage sensor electrically connected to the neutral point. The first voltage sensor may be configured to sense an AC voltage of one of the first, second, or third phase outputs of the three-phase AC power output at the neutral point, and to output a neutral point voltage signal in response to sensing the AC voltage. The active neutral control circuit may also include a controller electrically connected to the first voltage sensor and be configured to input the neutral point voltage signal, to generate a PWM control signal based on the neutral point voltage signal, and to output the PWM control signal to a single-phase inverter. The first voltage sensor may be configured to output the neutral point voltage signal to the controller, and the controller may be further configured to electrically connect to the single-phase inverter.

According to another non-limiting embodiment of the disclosure, a balanced power conversion system is provided. The balanced power conversion system may be configured to connect to a DC power source and may include a DC-AC inverter configured to electrically connect to a DC power source or a DC power output. The DC-AC inverter may include a three-phase DC-AC inverter configured to input a first DC power that is output from the DC power source or a second DC power that is output from the DC power output, to convert the first DC power or the second DC power to a three-phase AC power, and to output the three-phase AC power as a first, second, and third phase output. The DC-AC inverter may also include a single-phase DC-AC inverter configured to input the first DC power or the second DC power, to convert the first DC power or the second DC power to a first single-phase AC power, and to output the first single-phase AC power. The balanced power conversion system may also include an active neutral control circuit having a resistor bank electrically connected to the first, second, and third phase outputs of the three-phase DC-AC inverter. The resistor bank may have a first resistor, a second resistor, and a third resistor converging to a neutral point. Each of the first resistor, the second resistor, and the third resistor may have two terminals. One terminal of each of the first, second, and third resistors may be configured to connect to a different one of the phase outputs of the three-phase AC power output. The other terminals of the first, second, and third resistors may be connected together to form the neutral point. The balanced power conversion system may also include a first voltage sensor electrically connected to the neutral point. The first voltage sensor may be configured to sense an AC voltage of one of the first, second, or third phase outputs of the three-phase AC power output at the neutral point, and to output a neutral point voltage signal in response to sensing the AC voltage. The balanced power conversion system may also include a first controller electrically connected to the first voltage sensor. The first controller may be configured to input the neutral point voltage signal, to generate a PWM control signal based on the neutral point voltage signal, and to output the PWM control signal to a single-phase DC-AC inverter. The first voltage sensor may be configured to output the neutral point voltage signal to the first controller.

According to yet another non-limiting embodiment of the disclosure, a method for active neutral generation and balancing of phase voltages in a three-phase power output is provided. The method may include passing each phase of a three-phase power output through one resistor in a three-resistor bank, where each resistor has one terminal connected to a different phase of the three-phase power output and another terminal connected to the other terminals of the other resistors to form a neutral point. The method may also include measuring a phase voltage of one phase of the three-phase power output at the neutral point and outputting the measured phase voltage as a reference voltage signal.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 11 is a flow diagram of an example method for active neutral creation and power balancing for a three-phase power output.

In the drawings, reference numbers and characters may be reused to identify similar and/or identical elements.

DETAILED DESCRIPTION

Figure 1:
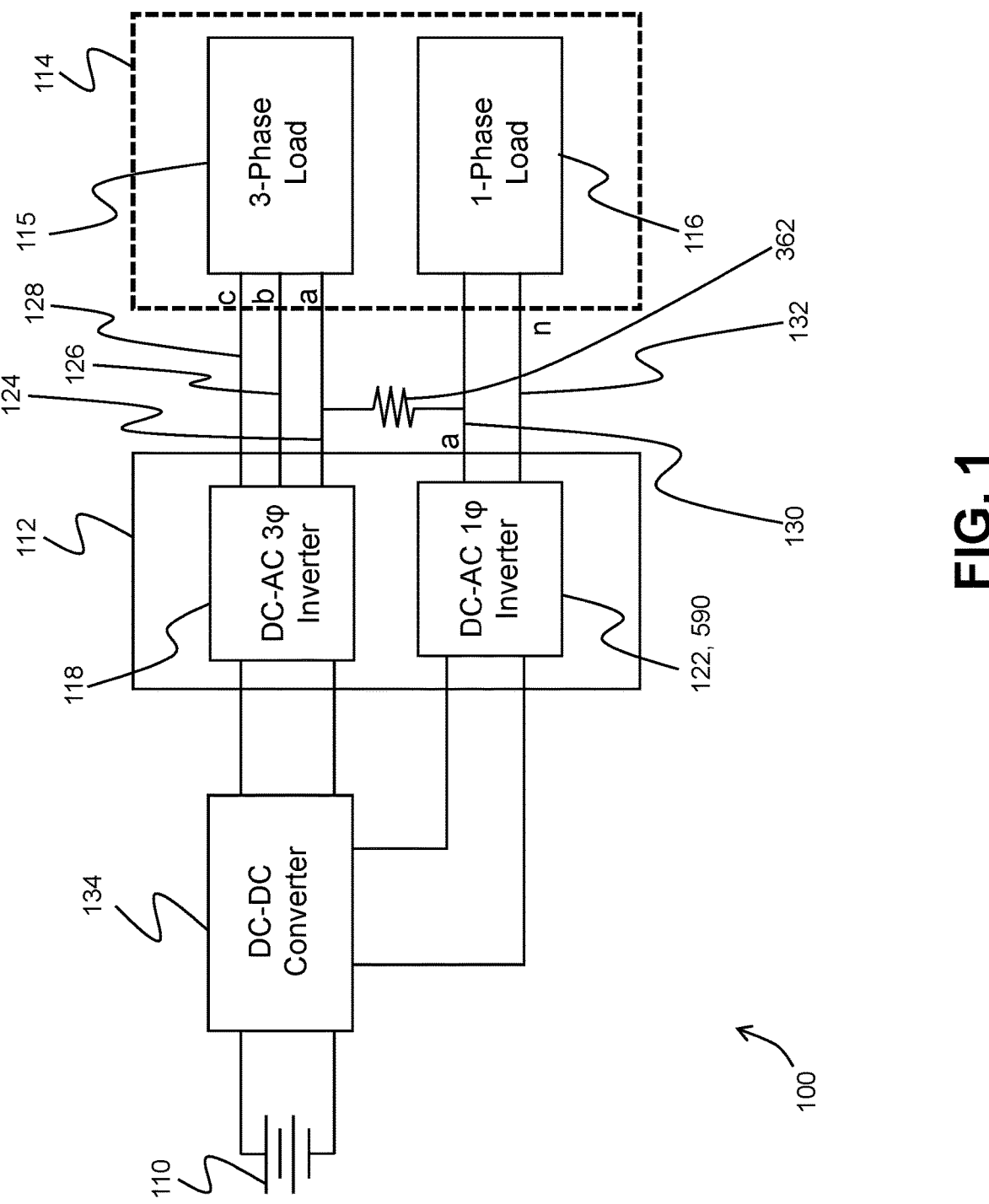
FIG. 1 illustrates an example schematic of a vehicle-based 5-wire inverter system.

Unbalanced loads in three-phase alternating current (AC) power systems may be problematic. A balanced load in a three-phase AC power system is where the currents and voltages on each of the three phases are both equal in magnitude and have a phase offset of 120° (degrees) with respect to each other, which means that the power being transmitted is distributed evenly across the three phases. In other words, each of the three phases carries the same magnitude of current with an evenly spaced phase difference between each of the phases. In instances where a three-phase load is arranged in a star or wye (Y) connection, where each of the phases is connected to a common neutral point as a return path, this neutral point will carry no current if the load is balanced since the vector sum of all three phase currents at the neutral point is zero. Such balancing results in less power loss (e.g., due to the resistance of the lines in the circuit) and less stress on the power generation, power conversion, and power transfer components in the circuit, such as generators, inverters, and transformers.

Conversely, an unbalanced load in a three-phase AC power system is where the currents and voltages for each phase are unequal—meaning more power is being transferred on one of the phases than the other two phases. In this instance, each phase may carry a different magnitude of current such that the vector sum at the neutral point connection is not zero, which means that the neutral line carries the net unbalanced current. This unbalance in the circuit results in power loss, stresses the components in the circuit, and may negatively affect the load.

A perfectly balanced load may be difficult to achieve. For example, in the three-phase AC power systems of related technologies, unbalanced loads (e.g., loads having reactive impedance components) will cause phase differences in the line current of each phase so that even if the currents of each phase were to have the same magnitude, the phase differences would result in an unbalanced current at the neutral point. Additionally, single-phase loads in the three-phase systems of the related technologies may never be fully balanced, despite best design efforts to achieve load balancing.

An inverter is a power electronics device or electric circuit that changes a direct current (DC) (e.g., DC power, DC voltage) into an alternating current (AC) (e.g., AC power, AC voltage). That is, an inverter does not produce power, but rather converts power from a DC source or DC output to an AC power. Example inverters include three-phase inverters that convert DC power into a three-phase AC power. Consequently, such three-phase inverters that output three-phase power to both three-phase and single-phase loads may be affected by the above-described problems of unbalanced loads in a three-phase AC power system.

Vehicle-based DC voltage sources may be used with an inverter to provide mobile AC power. That is, in lieu of AC electric power generated by a power plant and supplied through an existing electrical grid infrastructure (i.e., "grid power"), a DC power source on the vehicle may be converted by an inverter to AC power to use in place of grid power. However, the inverters, inverter systems, and inverter methods relied on by related technologies for providing AC power from vehicle-based DC voltages sources may have limitations and drawbacks.

First, the inverters, systems, and methods of the related technologies may rely on DC-link balancing to generate the neutral line for three-phase AC output. The neutral line provides a current path for the zero sequence currents of each of the phases, any of which could be large in instances where the loads are unbalanced. An uncontrolled neutral line with a neutral current having strong, low-frequency components may cause the neutral point potential to deviate significantly from the midpoint of the DC power source. Such deviation of the neutral point potential may cause an unbalanced or modulated output voltage, zero-sequence voltage components, and an increase of the neutral current. Thus, certain DC-link balancing configurations use a split DC link to provide a neutral point for DC-AC inverters. Using a split DC link configuration to provide the neutral point includes arranging two capacitors in series across the two terminals of the DC power source and in parallel with two large balancing resistors arranged in series to approximate the midpoint voltage of the DC power source. Because the neutral current flows through the capacitors, the capacitors may need significant capacitance to reduce the voltage ripple on the capacitors (e.g., ≥4000 μF (microfarad)). Another drawback of the split DC link configuration is that the neutral point usually drifts and becomes non-balanced, especially when the neutral current includes a DC component. Thus, the neutral point approximation of the split DC link configuration relies on heavy capacitors and does not provide a true neutral for calculating line-to-neutral voltages in a three-phase system. In turn, the neutral approximation by related technologies is prone to error and may not be accurate in calculating line-to-neutral voltages. As such, inverters using a split DC link may not be suitable for supplying power to unbalanced loads.

To solve these problems, an additional or fourth neutral leg (i.e., switching pair) may be added to a three-leg inverter in lieu of, or in addition to, the split DC link. However, the fourth neutral leg configuration may cause problems, as using a fourth neutral leg in place of the neutral point in the split DC link may cause high voltages at high frequencies on the two DC terminals that may cause electromagnetic interference (EMI) issues. Using the fourth neutral leg in addition to the DC link still presents that above-described issues whereby the neutral point may drift and become non-balanced.

In sum, the related-technology inverters, systems, and methods may not be capable of producing clean power. That is, the AC power provided by the related-technology inverters may include voltage spikes and voltage drops (i.e., voltage ripple), electrical noise, EMI, and other issues, all of which may be exacerbated by unbalanced three-phase loads.

Moreover, the inverters, inverter systems, and inverter methods of the related technologies, as they relate to mobile, vehicle-based inverters, may also be large and bulky. That is, related technologies may present logistical challenges, such as requiring additional equipment (e.g., a forklift) for moving the base inverter due to size and weight, and concrete pads for supporting additional components such as transformers, generators, etc.

Accordingly, the conventional inverters for converting DC power to AC power used by related technologies are subject to improvement.

The example embodiments described in the present disclosure may overcome the drawbacks and limitations of the related technology by providing a compact, lightweight active-neutral circuit and inverter that are capable of being transported by one or more persons and that can provide clean, three-phase balanced line-to-neutral voltages from a given set of three-phase balanced sinusoidal line-to-line reference voltages, even if the imposed load is unbalanced. The active neutral circuit and inverter embodiments described herein may be used to generate clean three-phase and single-phase AC electrical power from vehicle-generated DC electrical power by using a set of reference line-to-neutral voltage signals derived from line-to-line voltages as feedback signals in an active neutral control system, in lieu of approximating the line-to-neutral voltage as the midpoint of the DC power source by using the split DC link used by related technologies.

Example embodiments are described with reference to the accompanying drawings.

With reference now to FIG. 1, an example vehicle-based five wire (5-wire) inverter system 100 is illustrated. The vehicle-based inverter system 100 may include a DC power source 110 and a DC-AC inverter 112. The inverter system 100 may be configured to output, as a non-limiting example, about 60-200 kilowatts (kW) of AC power as a grid-tie inverter. However, the vehicle-based inverter system may be configured to output different amounts of AC power.

The inverter system 100 is configured to convert DC power from the DC power source 110 to AC power via the DC-AC inverter 112 to inject the AC power into an electrical power grid (not shown) to power a load 114. The load 114 may include both a three-phase load 115 and a single-phase load 116. Throughout the description, the load 114 may be described and illustrated as a singular load 114. But understandably, the load 114 may include a plurality of three-phase loads 115 and a plurality of single-phase loads 116. That is, the vehicle-based power system 100 is configured to provide power to a plurality of loads 114 and is not limited to powering one three-phase load 115 and one single-phase load 116, but rather may supply power to a plurality of three-phase loads 115 and a plurality of single-phase loads 116. The vehicle-based power system 100 may be used to provide expeditionary power for military and non-military applications to power, as non-limiting examples: multiple individual homes during emergencies and in the aftermath of natural disasters; a base camp; one or more cell phone towers; a community center; and like applications requiring mobile AC power. The vehicle-based inverter system 100 may be used individually, combined with other vehicle-based inverter systems 100, or used in addition to other power generating devices, for example, as part of a power station.

While used here as a non-limiting example, the vehicle-based inverter system 100 may be configured to convert vehicle-generated DC electrical power to standard U.S. Army expeditionary power requirements—that is, converting DC power to a three-phase 208 volts alternating current (VAC). However, it is understood that the vehicle-based inverter system 100 may be configured to output different voltage levels.

The vehicle-based inverter system 100 may include the DC power source 110. The DC power source 110 may be a rectified, vehicle-based AC power source (not shown), such as a vehicle alternator or generator. The DC power source 110 may also be a DC power source such a battery or battery bank (not shown). The DC power source, as a non-limiting example, may be configured to output about 600 volts direct current (VDC). As used throughout the description and the drawings, the DC power source 110 may also be referred to as a DC voltage source 110, because a DC voltage can be acquired from the DC power that is output from the DC power source 110.

The vehicle-based inverter system 100 may also include the DC-AC inverter 112. While the DC-AC inverter 112 is illustrated as a single module in FIG. 1, a portion of the DC-AC inverter 112 may include elements operating as a three-phase DC-AC inverter 118 and with another portion having elements operating a single-phase DC-AC inverter 122. Throughout the description and drawings, the Greek letter "phi" (i.e., Φ, φ) may be used to represent the word "phase," e.g., 1 φ to mean single-phase, 3 φ to mean three-phase.

The three-phase DC-AC inverter 118 may be configured to convert DC power from the DC power source 110 into three-phase AC power for powering the load 114. The three-phase AC power from the three-phase DC-AC inverter 118 may be used to power both the three-phase load 115 and the single-phase load 116. The single-phase DC-AC inverter 122 may be configured to convert DC power from the DC power source 110 into a single-phase AC power as part of an active neutral circuit for purposes of balancing individual phase voltages, as described below in greater detail. The single-phase DC-AC inverter 122 may also be configured to convert DC power from the DC power source 110 into a single-phase AC power for powering the single-phase load 116.

The DC-AC inverter 112 including the three-phase DC-AC inverter 118 and the single-phase DC-AC inverter 122 are not power sources. Rather, the inverters 112, 118, and 122 convert DC power to AC power and output the AC power. As such, the inverters 112, 118, and 122 may be referred to throughout the description as AC power outputs to distinguish these components from a power source.

The DC-AC inverter 112 may also be configured to be a 5-wire or 5-output inverter. That is, in addition to the three-phase output (three outputs/wires) from the three-phase DC-AC inverter 118 and the single-phase output (one output/wire) from the single-phase DC-AC inverter 122, the DC-AC inverter 112 may also include a neutral leg circuit configured to output an AC power and balance neutral load currents on a neutral line (i.e., the neutral leg is considered as one output or wire).

Each of the conductors from the three-phase DC-AC inverter 118 to the load 114 may be referred to as "lines" or "phases" and are outputs of the three-phase DC-AC inverter designated, for example, as an "a" phase or "a" line 124, a "b" phase or "b" line 126, and a "c" phase or "c" line 128. Likewise, the electrical line or phase from the single-phase DC-AC inverter 122 may be, for example, designated as an "a" phase 130 from the single-phase inverter 122.

The output of the single-phase DC-AC inverter 122 is not limited to being designated as an "a" phase or "a" line, but the "a" phase 130 from the single-phase inverter 122 is used as an example throughout the description for convenience.

The output of the neutral leg of the DC-AC inverter 112 may be designated as an "n" line 132, neutral line 132, or an "n" neutral line 132. The neutral line 132 may alternatively be referred to as "n" output or "n" neutral output 132, or more simply as "n" 132 or "n" neutral 132, or some combination thereof.

Additionally, the drawings may illustrate the "a," "b," "c," and "n" descriptors alone to provide context and understanding of the phase and neutral wires/components throughout the drawings. The use of "a," "b," etc., when used in conjunction with the reference numbers in the drawings, does not necessarily imply or connote an element's association with any particular phase. Rather, these alphanumeric reference characters may be used to distinguish between similar elements in the drawings. For example, neutral point 236a shown in FIG. 2A uses "a" to distinguish this neutral point from similar neutral point 236b shown in FIGS. 2B. As such, neutral points 236a and 236b are neutral or "n" points, and do not necessarily connote an association with the "a" or "b" phases.

As used herein with respect to the three-phase output of the three-phase DC-AC inverter 118 and the "n" neutral line 132, the "a" phase 124, "b" phase 126, "c" phase 128, and "n" neutral 132 may be used in combination as subscript descriptors to indicate the AC line voltages (i.e., line-to-line voltages) and AC phase voltages (i.e., line-to-neutral voltages) of the three-phase DC-AC inverter 118. For example, the line-to-line voltages of the "a" line 124 and the "b" line 126 may be indicated as an AC voltage with the label "$V_{ab}$." The line-to-neutral voltage of the "a" line 124, as measured from phase/line "a" 124 to the neutral "n" line 132 may be indicated as an AC voltage with the label "$V_{an}$."

As a non-limiting example, the line-to-line voltages (or line voltages) for each of $V_{ab}$ (i.e., the voltage measured between the "a" line 124 and the "b" line 126), $V_{bc}$ (i.e., the voltage measured between the "b" line 126 and the "c" line 128), and $V_{ca}$ (i.e., the voltage measured between the "c" line 128 and the "a" line 124) may all be 208 VAC. In this non-limiting example, each of the line-to-neutral voltages (or phase voltages) for each of $V_{an}$ (i.e., the voltage measured between the "a" line 124 and the neutral "n" line 132), $V_{bn}$ (i.e., the voltage measured between the "b" line 126 and the neutral "n" line 132), and $V_{cn}$ (i.e., the voltage measured between the "c" line 128 and the neutral "n" line 132) each may be 120 VAC.

With respect to the single-phase output of the single-phase DC-AC inverter 122 and the "n" neutral line 132, the single-phase AC voltage may be designated as $V_{ans}$ with an additional "s" denoting single-phase to distinguish the "a"

phase voltage $V_{ans}$ that is output from the single-phase DC-AC inverter 122 from the "a" phase voltage $V_{an}$ derived from the "a" output 124 of the three-phase DC-AC inverter 118.

The vehicle-based inverter system 100 may also include a DC-DC converter 134 arranged between the DC power source 110 and the DC-AC inverter 112. The DC-DC converter 134 may be a power electronics converter that changes an input DC voltage level to a different output DC voltage level. The DC-DC converter 134 is not a DC power source. That is, the DC-DC converter 134 does not produce DC power on its own, but rather takes a DC power input and outputs a DC power. As such, the DC-DC converter 134 may be referred to as a DC power output to distinguish the DC-DC converter 134 from a DC power source.

The DC-DC converter 134 may be configured to be bidirectional. That is, the DC-DC converter 134 may not be limited to moving power in one direction from the input of the DC-DC converter 134 to the output of the DC-DC converter 134 but may instead be configured to move power bidirectionally (e.g., from input to output and from output to input).

The DC-DC converter 134 is configured to reduce the DC voltage from the DC power source 110 to a lower DC voltage level before this reduced DC voltage enters the DC-AC inverter 112 for conversion to an AC voltage. Accordingly, the DC-DC converter 134 may include a buck converter or step-down converter circuit arrangement that steps-down (i.e., decreases) an input DC voltage to a lower output DC voltage. As a non-limiting example, the DC-DC converter 134 may be configured to step-down an input voltage from 600 VDC and output a reduced voltage around 400 VDC, for example, 377 VDC. In this example, the stepped-down DC voltage of around 377 VDC may be input into the DC-AC inverter 112 for conversion to, and output as, an AC line voltage around 208 VAC or an AC phase voltage around 120 VAC.

Figure 2A:
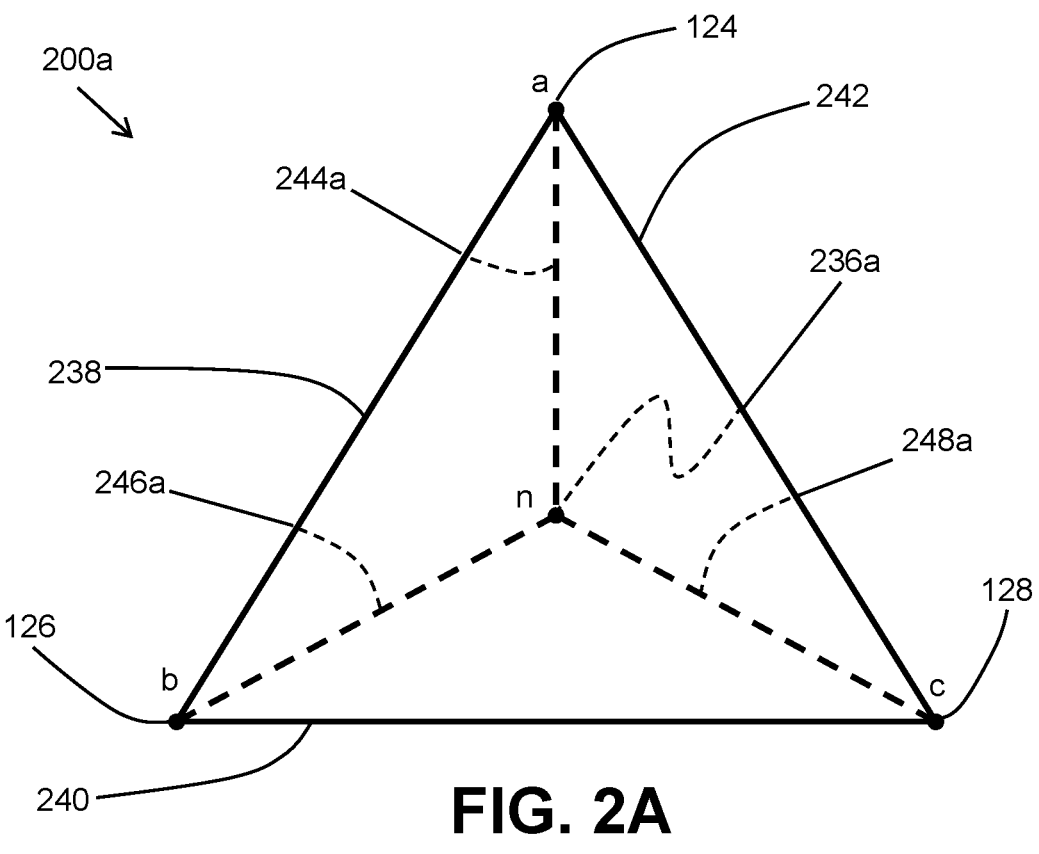
FIG. 2A illustrates an example relationship between line-to-line voltages and phase voltages in a 3-phase power system.
Figure 2B:
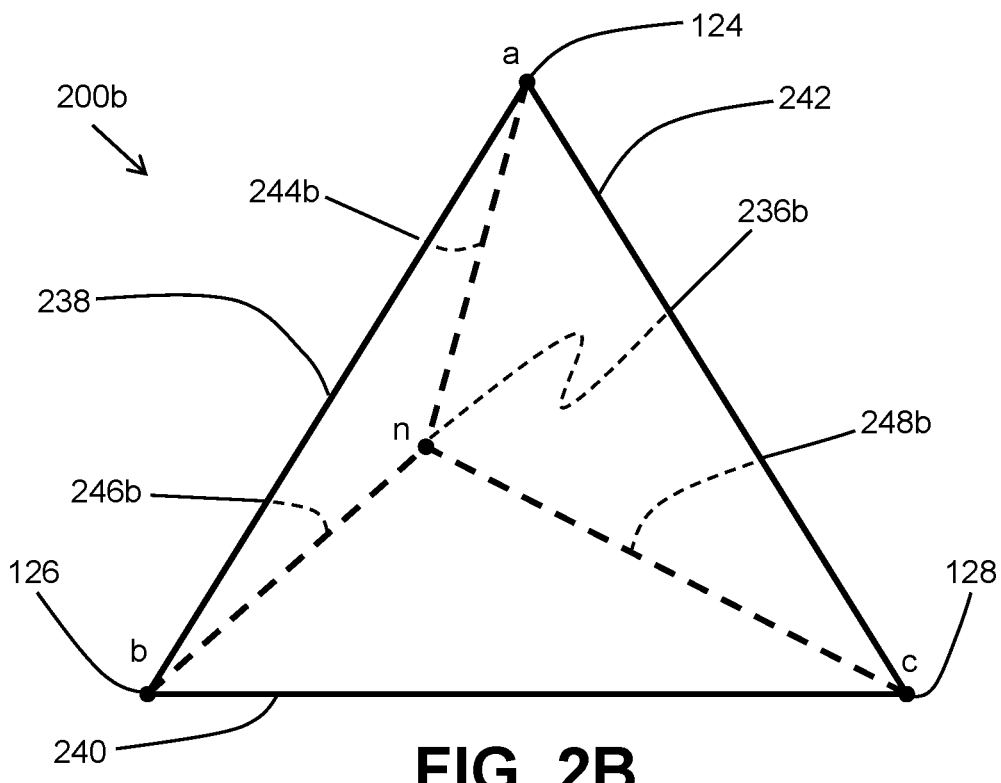
FIG. 2B illustrates yet another example relationship between line-to-line voltages and phase voltages in a 3-phase power system.
Figure 3:
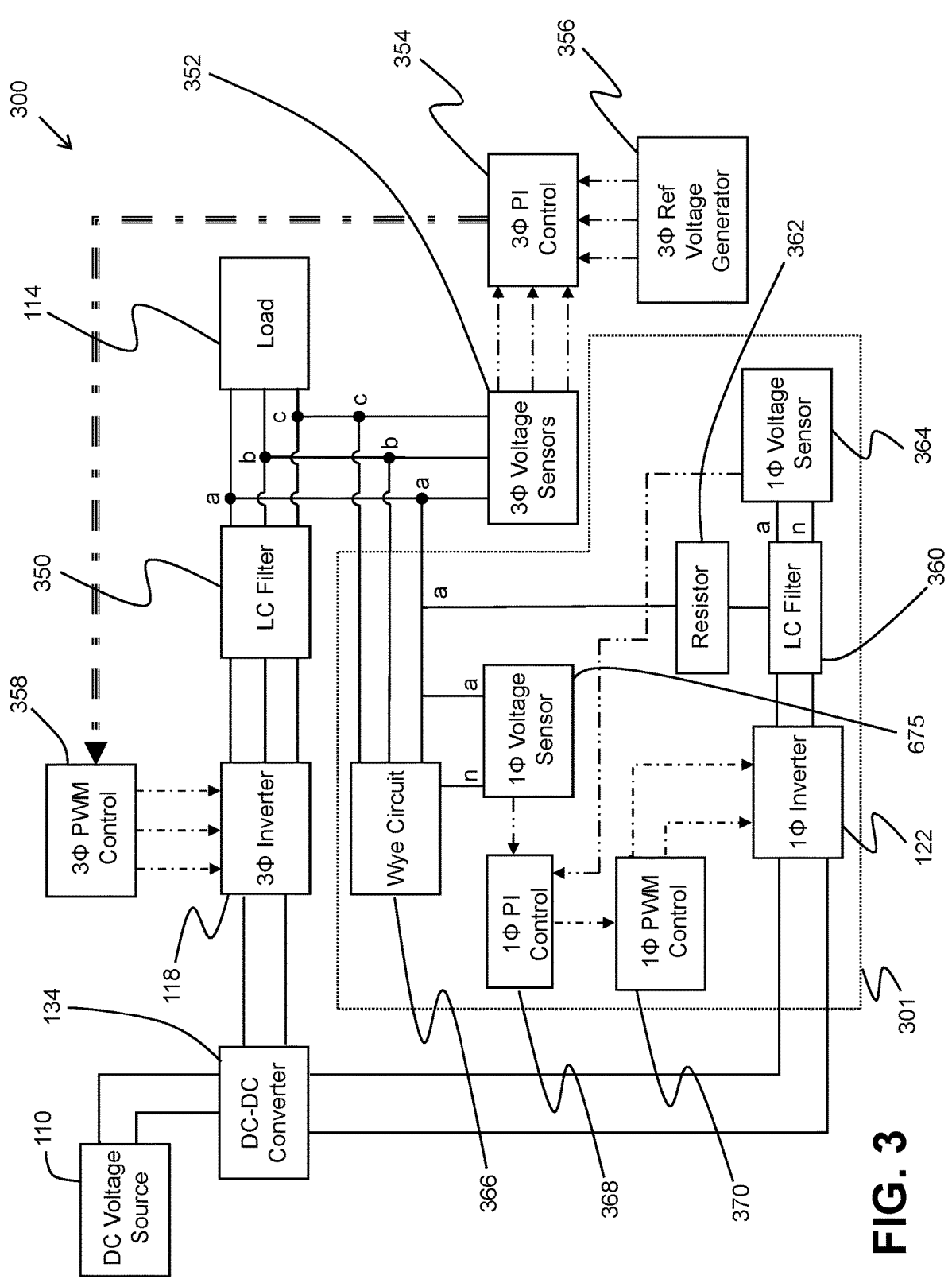
FIG. 3 illustrates an example schematic of a balanced power conversion system including an active neutral control circuit.

With reference now to FIG. 3, an example balanced power conversion system 300 for converting DC power to a balanced AC power is illustrated. The balanced power conversion system 300 may include some of the elements from the vehicle-based inverter system 100 shown in FIG. 1, in addition to including an active neutral control circuit 301, as well as other elements. The balanced power conversion system 300 is configured to utilize the active neutral control circuit 301 to output a balanced three-phase AC power from the three-phase inverter 118, even in instances where the load 114 is unbalanced. To better understand the balancing role the active neutral control circuit 301 provides, a brief mathematical background is provided with reference to FIGS. 2A and 2B.

With reference now to FIGS. 2A and 2B, example graphical relationships between the line-to-line voltages and phase voltages in a three-phase power system are illustrated. More specifically, FIGS. 2A and 2B illustrate graphical examples of a balanced three-phase AC power 200a with a balanced neutral point 236a, and a balanced line-to-line AC power 200b with an unbalanced neutral point 236b. In both FIGS. 2A and 2B, the graphical examples 200a and 200b may represent three-phase AC power outputs, for example, as output from the three-phase DC-AC inverter 118 to the three-phase load 114, as shown in FIGS. 1 and 3. As such, the output from the "a" line 124 in FIG. 1, may be represented by the "a" point 124 in FIGS. 2A and 2B, the output from the "b" line 126 in FIG. 1 may be represented by the "b" point 126 in FIGS. 2A and 2B, and the output from the "c" line 128 in FIG. 1 may be represented by the "c" point 128 in FIGS. 2A and 2B.

The lines connecting the "a" point 124, "b" point 126, and "c" point 128 in the graphical examples 200a and 200b, shown respectively in FIGS. 2A and 2B, may correspond to the line voltages (i.e., line-to-line voltages) between the respective phases. For example, a line 238 between the "a" point 124 and the "b" 126 may represent the line-to-line voltage $V_{ab}$. In other words, the line 238 is the line-to-line voltage $V_{ab}$ 238. Likewise, lines 240 and 242 may respectively represent line-to-line voltages $V_{bc}$ 240 and $V_{ca}$ 242.

In FIG. 2A, a line 244a between the "a" point 124 and the balanced neutral point 236a corresponds to the phase (i.e., line-to-neutral voltage) $V_{an}$ 244a. Likewise, the lines 246a and 248a respectively correspond to the phase voltages $V_{bn}$ 246a, and $V_{cn}$ 248a. Similarly, the lines 244b, 246b, and 248b in FIG. 2B correspond respectively to the phase voltages $V_{an}$ 244b, $V_{bn}$ 246b, and $V_{cn}$ 248b, as measured between the "a," "b", and "c" points 124, 126, and 128, and the unbalanced neutral point 236b.

With reference to FIGS. 2A and 2B, the balanced three-phase line-to-line voltages (i.e., line voltages) $V_{ab}$ 238, $V_{bc}$ 240, and $V_{ca}$ 242 can be defined by Equations 1, 2, and 3 below.

$$V_{ab} = |V| \cos(2\pi f t) \qquad \text{(Equation 1)}$$

$$V_{bc} = |V| \cos(2\pi f t - 120°) \qquad \text{(Equation 2)}$$

$$V_{ca} = |V| \cos(2\pi f t - 240°) \qquad \text{(Equation 3)}$$

In Equations 1, 2, and 3 above, $V_{ab}$, $V_{bc}$, and $V_{ca}$ are the line-to-line voltages, |V| is the amplitude of the voltage, f is the frequency, and t is the time.

In FIGS. 2A and 2B, the phase voltages, that is, line-to-neutral voltages, are described generally as $V_{an}$ 244, $V_{bn}$ 246, and $V_{cn}$ 248—without any additional alphanumeric added to the reference characters—regardless of whether the phase voltages are balanced or unbalanced. The phase voltages $V_{an}$ 244a, $V_{bn}$ 246a, and $V_{cn}$ 248a, as shown in FIG. 2A, are balanced and include an additional "a" added to the reference characters. In contrast, the phase voltages $V_{an}$ 244b, $V_{bn}$ 246b, and $V_{cn}$ 248b, as shown in FIG. 2B, are unbalanced and include an additional "b" added to the reference characters.

Based on circuit theory, the corresponding balanced three-phase phase voltages (i.e., line-to-neutral voltages) $V_{an}$ 244a, $V_{bn}$ 246a, and $V_{cn}$ 248a, as shown in FIG. 2A, can be defined by Equations 4, 5, and 6 below.

$$V_{an} = \left(\frac{|V|}{\sqrt{3}}\right) \cos(2\pi f t - 30°) \qquad \text{(Equation 4)}$$

$$V_{bn} = \left(\frac{|V|}{\sqrt{3}}\right) \cos(2\pi f t - 150°) \qquad \text{(Equation 5)}$$

$$V_{cn} = \left(\frac{|V|}{\sqrt{3}}\right) \cos(2\pi f t - 270°) \qquad \text{(Equation 6)}$$

In Equations 4, 5, and 6 above, $V_{an}$, $V_{bn}$, and $V_{cn}$ are the line-to-neutral voltages, |V| is the amplitude of the voltage, f is the frequency, and t is the time.

Given the phase voltages $V_{an}$ 244, $V_{bn}$ 246, and $V_{cn}$ 248, the line voltages $V_{ab}$ 238, $V_{bc}$ 240, and $V_{ca}$ 242 can be defined by Equations 7, 8, and 9 below.

$$V_{ab} = V_{an} - V_{bn} \qquad \text{(Equation 7)}$$

$$V_{bc} = V_{bn} - V_{cn} \qquad \text{(Equation 8)}$$

$$V_{ca} = V_{cn} - V_{an} \qquad \text{(Equation 9)}$$

The equations above are not independent. That is, given the line voltages $V_{ab}$ 238, $V_{bc}$ 240, and $V_{ca}$ 242, the corresponding phase voltages $V_{an}$ 244, $V_{bn}$ 246, and $V_{cn}$ 248 are not unique. The phase voltages $V_{an}$ 244, $V_{bn}$ 246, and $V_{cn}$ 248 can be independent quantities and not necessarily equal to one another, for example, as illustrated by the unbalanced phase voltages $V_{an}$ 244b, $V_{bn}$ 246b, and $V_{cn}$ 248b, as shown in FIG. 2B. In other words, while corresponding to the balanced line-to-line voltages $V_{ab}$ 238, $V_{bc}$ 240, and $V_{ca}$ 242, the corresponding phase voltages $V_{an}$ 244, $V_{bn}$ 246, and $V_{cn}$ 248 may not be unique, the balanced phase voltages $V_{an}$ 244a, $V_{bn}$ 246a, and $V_{cn}$ 248a with the balanced neutral point 236a may have a unique correspondence to the line voltages $V_{ab}$ 238, $V_{bc}$ 240, and $V_{ca}$ 242, for example, as shown in FIG. 2A. Likewise, the unbalanced phase voltages $V_{an}$ 244b, $V_{bn}$ 246b, and $V_{cn}$ 248b with the unbalanced neutral point 236b may also have a unique correspondence to the line voltages $V_{ab}$ 238, $V_{bc}$ 240, and $V_{ca}$ 242, for example, as shown in FIG. 2B.

The above equations can be used as the basis for determining a balanced neutral point by the active neutral control circuit 301 in the balanced power conversion system 300, even in instances of unbalanced phase voltages $V_{an}$ 244b, $V_{bn}$ 246b, and $V_{cn}$ 248b. In other words, the active neutral control circuit 301 may use the relations above in Equations 1-9 as the basis for adjusting the phase voltages 244, 246, and 248 to adjust the unbalanced three-phase power output 200b shown in FIG. 2B to the balanced three-phase power output 200a shown in FIG. 2A.

Figure 4:
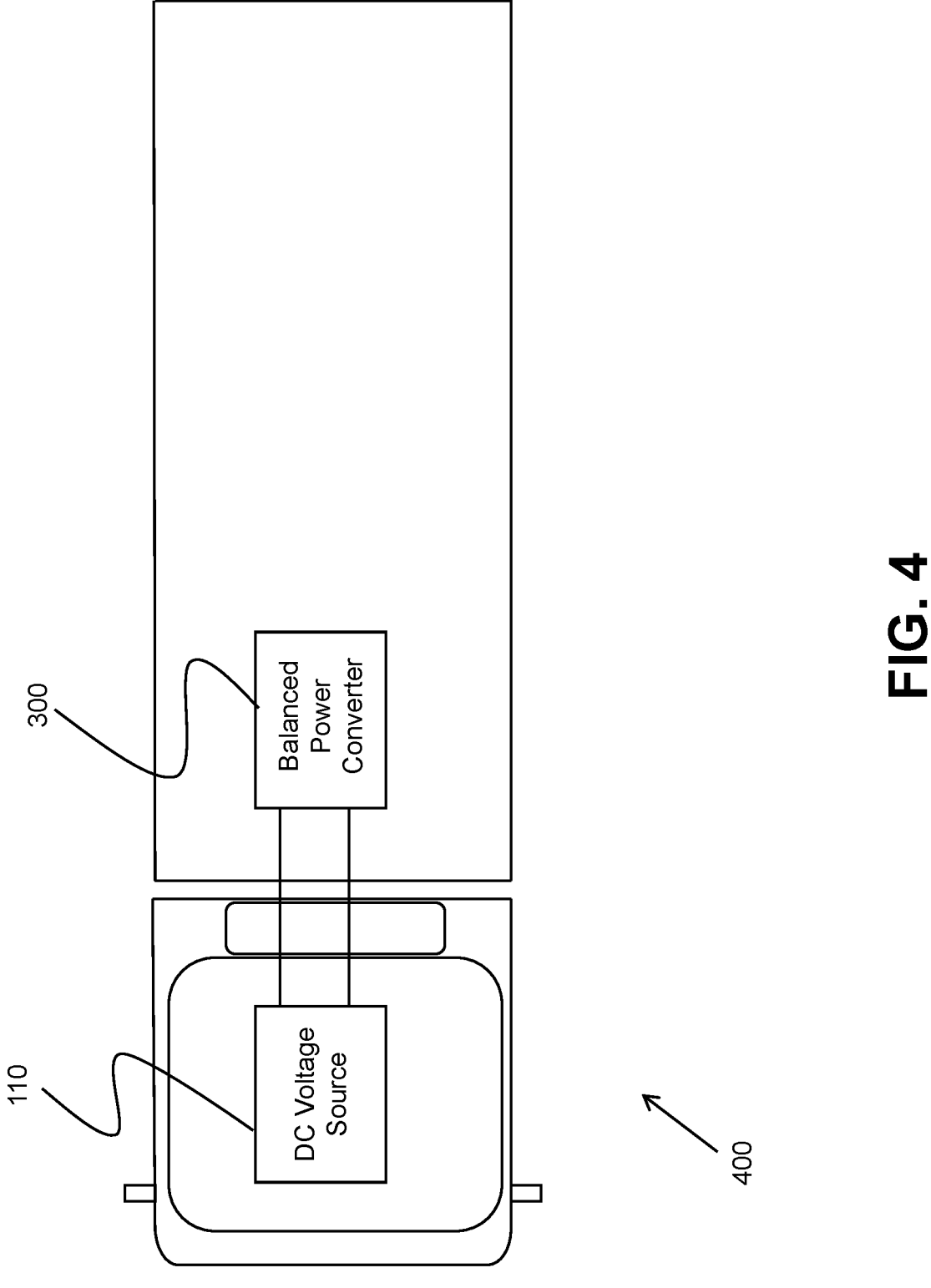
FIG. 4 illustrates an example schematic of a balanced power conversion system on a vehicle.

With reference now to FIG. 4, in one example embodiment, the balanced power conversion system 300 may be configured to be selectively added and removed from a vehicle 400. That is, the balanced power conversion system 300 may not be a permanent fixture of the vehicle 400. Rather, the balanced power conversion system 300 may be selectively added and removed from the vehicle 400 as needed.

In the example embodiment shown in FIG. 4, the balanced power conversion system 300 may not include a power source. The balanced power conversion system 300 may be configured to connect to a power source on the vehicle 400, such as the DC power source 110 on the vehicle 400, to convert the DC voltage from the DC power source 110 to an AC voltage, and to then output the AC voltage as a balanced AC voltage.

The DC power source 110 may be a permanent or semi-permanent fixture of the vehicle 400. In other words, the DC power source 110 may not be as easily removed (or may not be intended to be removed) from the vehicle 400, in contrast to the selective removability of the balanced power conversion system 300 that may be more easily removed from, and added to, the vehicle 400.

With reference again to FIG. 3, the balanced power conversion system 300 may include some of the elements of the vehicle-based inverter system 100, such as the DC-AC inverter 112 and the DC-DC converter 134. More specifically, the balanced power conversion system 300 includes the three-phase inverter 118, a three-phase LC (inductor-capacitor) filter 350, three-phase voltage sensors 352, a three-phase controller 354, a three-phase reference voltage generator 356, a three-phase pulse-width modulation (PWM) generator 358, and the DC-DC converter 134, in addition to the active neutral control circuit 301. As described above with reference to FIG. 4, the balanced power conversion system 300 may not necessarily include the DC voltage source 110. Rather, the balanced power conversion system 300 is configured to connect to, and disconnect from, the DC voltage source 110.

The active neutral control circuit 301 includes the single-phase inverter 122 with a neutral leg, a single-phase LC (inductor-capacitor) filter 360, a resistor 362, a single-phase voltage sensor 364, a wye circuit 366, a single-phase controller 368, and a single-phase PWM generator 370. Active neutral implies creating a neutral point in the balanced power conversion system 300, specifically in the active neutral control circuit 301, where a neutral point would not have been necessarily available.

Figure 5:
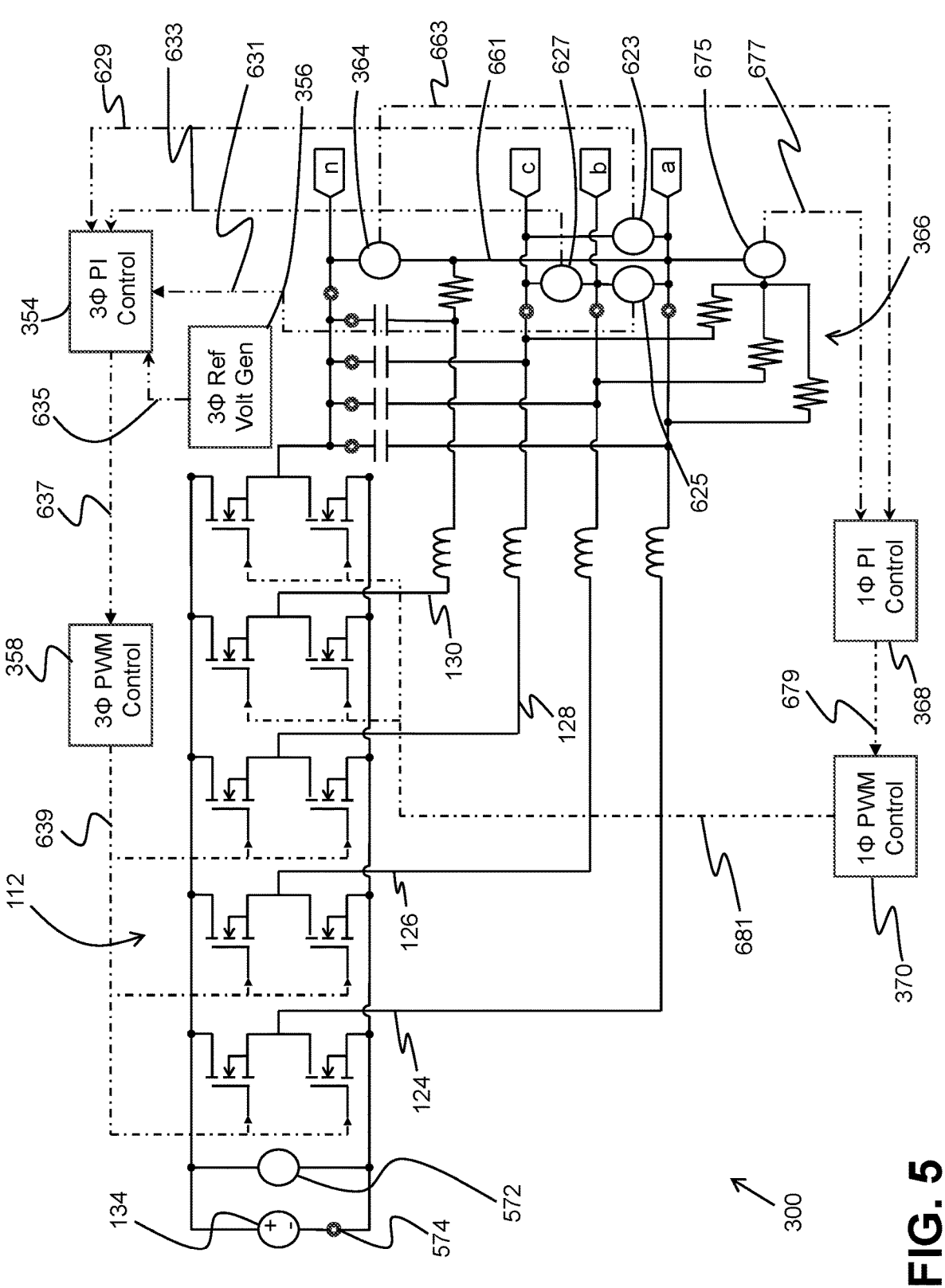
FIG. 5 illustrates yet another example schematic of a balanced power conversion system including an active neutral control circuit.
Figure 6:
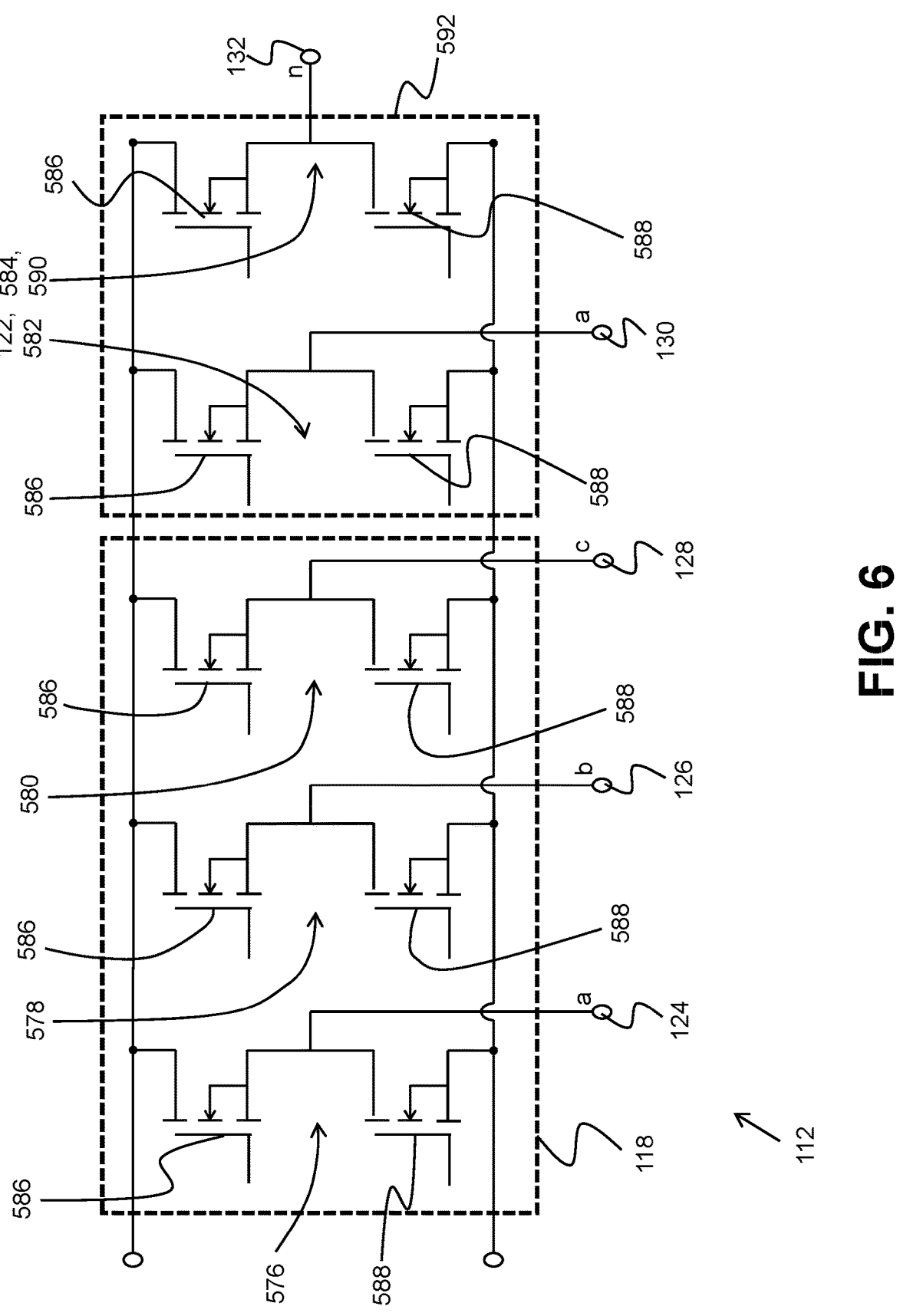
FIG. 6 illustrates an example 5-wire inverter.
Figure 7:
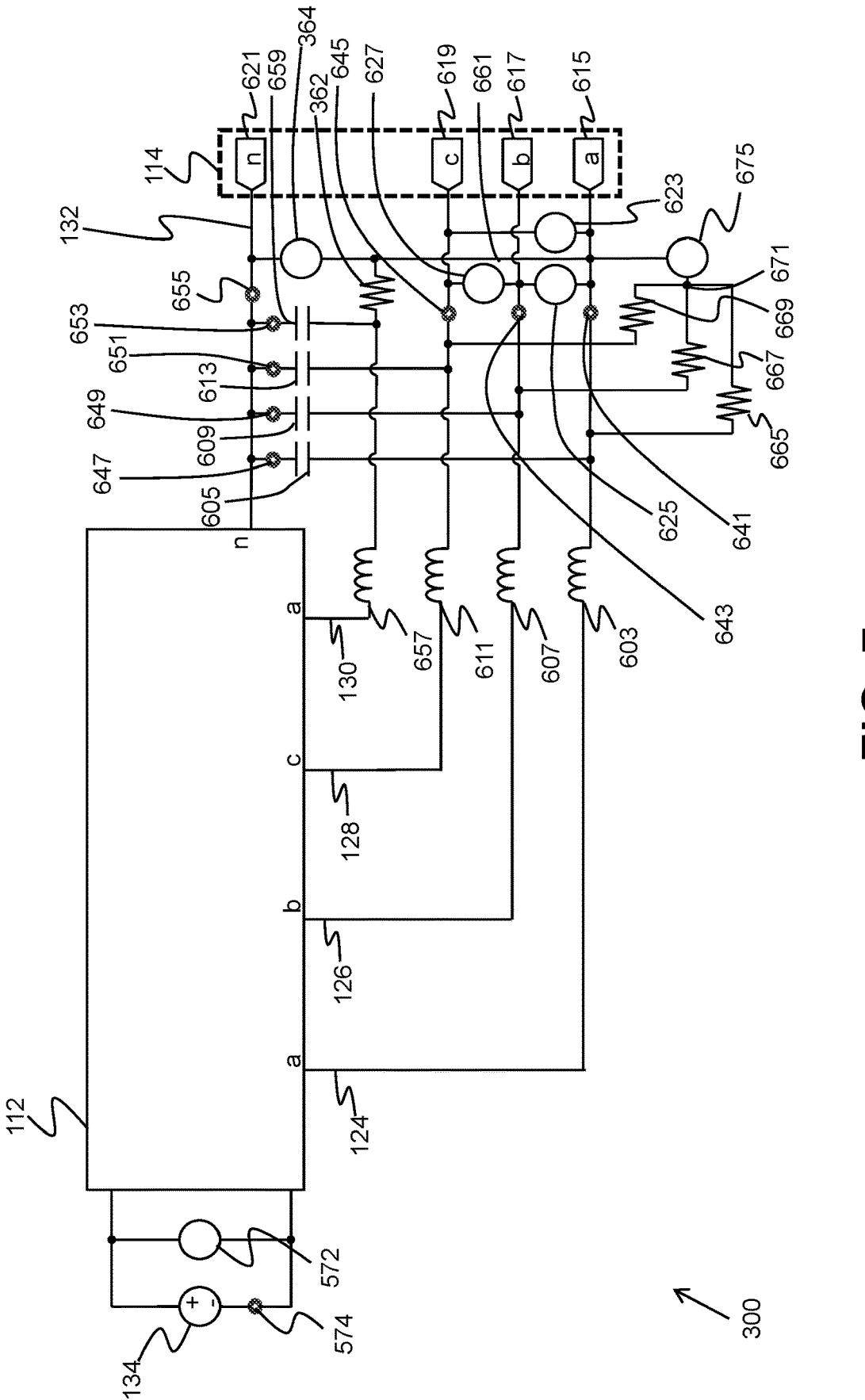
FIG. 7 illustrates yet another example schematic of a balanced power conversion system including an active neutral control circuit.

With reference now to FIGS. 3, 5, 6, and 7, the balanced power conversion system 300 and the active neutral control circuit 301 are described in greater detail. FIG. 3 illustrates a high-level schematic of an example embodiment of the balanced power conversion system 300 and the active neutral control circuit 301. FIG. 5 illustrates a more detailed schematic of the example embodiment of the balanced power conversion system 300 and the active neutral control circuit 301 and includes controllers and signal lines. FIG. 6 illustrates the 5-wire DC-AC inverter 112 shown in FIG. 5 in greater detail. FIG. 7 illustrates the example embodiment of the balanced power conversion system 300 and the active neutral control circuit 301 shown in FIG. 5 without the 5-wire DC-AC inverter 112 being shown in detail, and without the controllers and signal lines.

DC power is input into the balanced power conversion system 300 via the DC-DC converter 134. The DC-DC converter 134 steps down a DC voltage from an external DC power source, for example, the DC voltage source 110 when the balanced power conversion system 300 is electrically connected to the DC voltage source 110. While the balanced power conversion system 300 does not include a power source and is configured to be connected to an external power source, the DC-DC converter 134 acts as a power output by taking an external power as an input and outputting a power to the balanced power conversion system 300.

The DC-DC converter 134 may be in electrical connection to a voltage sensor 572 and a current sensor 574 that respectively monitor the DC voltage and the DC current that are output from the DC-DC converter 134. The voltage sensor 572 may be configured to measure a DC voltage value of the DC power that is output by the DC-DC converter 134. The voltage sensor 572 may output any measured DC voltage as a signal. The current sensor 574 may be configured to measure a DC current value of the DC power that is output by the DC-DC converter 134 and to output any measured DC current as a signal. The signals from the voltage sensor 572 and the current sensor 574 may be used as a basis for monitoring the proper operation of the DC-DC converter 134 and for further control of the balanced power conversion system 300.

The DC power and its voltage component are output from the DC-DC converter 134 and input into the DC-AC inverter 112. The DC-AC inverter 112 changes the DC power to an AC power, and outputs the AC power and its AC voltage component. The DC-AC inverter 112 is not a power source. That is, the DC-AC inverter 112 does not generate AC power on its own, but rather provides AC power as an output. As such, the DC-AC inverter 112 may be referred to as an AC power output to distinguish the DC-AC inverter 112 from an AC power source.

With specific reference now to FIG. 6, the 5-wire DC-AC inverter 112 shown in FIG. 5 is isolated from the balanced power conversion system 300 to show the DC-AC inverter 112 in greater detail. The DC-AC inverter 112 includes a plurality of power electronic switching modules (i.e., control switch pairs) 576, 578, 580, 582, and 584. Each of the switching modules 576, 578, 580, 582, and 584 may be configured as a half-bridge circuit and include a pair of power electronic control switches 586, 588.

The DC-AC inverter 112 may be arranged to include the three-phase DC-AC inverter 118, the single-phase DC-AC inverter 122, and a neutral leg 590. In FIG. 6, the single-phase DC-AC inverter 122 is generally represented by the switching module 582. As such, a single lead line in FIG. 6 generally refers to both the single-phase DC-AC inverter 122 and the switching module 582. Likewise, the neutral leg 590 is generally represented by the switching module 584. As such, a single lead line in FIG. 6 generally refers to both the neutral leg 590 and the switching module 584. Throughout the description, the plurality of switching modules 576, 578, 580, 582, and 584 may include an ordinal descriptor (e.g., first, second, third) two distinguish one switching module from the other.

In an example embodiment, the single-phase DC-AC inverter 122 and the neutral leg 590 may be grouped together to operate as a full-bridge single-phase DC-AC inverter 592. The full-bridge single-phase DC-AC inverter 592 may be a component of the DC-AC inverter 112 together with the three-phase DC-AC inverter 118. As shown in FIG. 6, one dashed box indicates the switching modules forming the three-phase DC-AC inverter 118 and another dashed box indicates the switching modules forming the full-bridge single-phase DC-AC inverter 592.

As a non-limiting example, the electronic switches 586 and 588 in each of the switching modules 576, 578, 580, 582, 584 may be a power electronics semiconductor device configured as an electronic switch, such as: a metal-oxide-semiconductor field-effect transistor (MOSFET), a bipolar junction transistor (BJT), a junction-gate field-effect transistor (JFET), an insulated-gate bipolar transistor (IGBT), a thyristor, and like electronics switching devices. The electronic switches 586 and 588 may include a plurality of terminals, such that a voltage or current applied to a pair of terminals on each switch 586, 588 may control the current flow through another pair of terminals on the switch. The voltage or current applied to the pair of terminals on each switch 586, 588 may be an electric signal, for example, as output by a driver, as output by a controller as a control signal, or as output by a PWM generator as a PWM signal.

In each of the switching modules 576, 578, 580, 582, 584, each switch pair 586, 588 is configured to operate so that both switches 586, 588 of the pair do not operate (i.e., turn ON) at the same time in each of the switching modules 576, 578, 580, 582, 584. For example, in the switching module 576, when the one switch 586 is turned ON the other switch 588 is OFF. The selective operation of the switches 586, 588 in each of the switching modules 576, 578, 580, 582, 584 may be used to change a DC voltage output from the DC-DC converter 134 to an AC voltage, whereby the AC voltage output from each of the switching modules 576, 578, 580, 582, 584 may be (or approximate) a square wave, a sinusoidal AC waveform, or a modified sine wave.

The three-phase DC-AC inverter 118 of the DC-AC inverter 112 may include the switching modules (i.e., control switch pairs) 576, 578, 580. The three-phase PWM generator 358, or more specifically the PWM control signals output from the three-phase PWM generator 358, may be used to control the ON-OFF switching of the switches 586, 588 in the switching modules 576, 578, 580 to control the duty cycle of the switches 586, 588. That is, the PWM signals from the three-phase PWM generator 358 may be input to the switching modules 576, 578, 580 to control the duration that each of the switches 586, 588 in the switching modules 576, 578, 580 are turned ON and OFF. Controlling the ON-OFF switching of the electronic switches 586, 588 in the switching modules 576, 578, 580 may be used to control the AC output of the switching modules 576, 578, 580, for example, to control a magnitude and phase offset of the AC output.

As a non-limiting example, the switching module 576 may output an AC voltage to the "a" phase (i.e., "a" line) 124, the switching module 578 may output an AC voltage to the "b" phase (i.e., "b" line) 126, and the switching module 580 may output an AC voltage to the "c" phase (i.e., "c" line) 128. The AC voltages respectively output by the switching modules 576, 578, 580 in the three-phase DC-AC inverter 118 to the "a," "b," and "c" phases 124, 126, 128 may have a phase offset of 120° (degrees) relative to each other.

With reference again to FIG. 3, the AC voltages output by the three-phase DC-AC inverter 118 as the "a," "b," and "c" phases 124, 126, 128 pass through the three-phase LC filter 350. With reference now to FIG. 7, the LC filter 350 includes an inductor and capacitor circuit (i.e., LC circuit) arranged in series for each of the "a," "b," and "c" phases 124, 126, 128. For example, the LC filter for the "a" phase 124 includes the inductor 603 and the capacitor 605, the LC filter for the "b" phase 126 includes the inductor 607 and the capacitor 609, and the LC filter for the "c" phase 128 includes the inductor 611 and the capacitor 613. The inductors 603, 607, 611 and capacitors 605, 609, 613 may be collectively referred to as the three-phase LC filter 350. The three-phase LC filter 350 may be used to smooth the output AC waveforms of the "a," "b," and "c" phases 124, 126, 128 of the three-phase DC-AC inverter 118, in addition to filtering certain frequency components of the output AC waveforms. That is, for any square- or modified sine waves output by the three-phase DC-AC inverter 118, the three-phase LC filter 350 may help to smooth these waveforms into more sinusoidal-shaped waveforms.

The "a," "b," and "c" phase outputs 124, 126, 128 from the three-phase DC-AC inverter 118 may be used to power the load 114. Again, as described above with reference to FIG. 1, the load 114 may include both three-phase load 115 and/or single-phase load 116 components. In FIG. 7, the load 114 may include an "a" load component 615, a "b" load component 617, and a "c" load component 619. It is understood that the "a," "b," and "c" load components 615, 617, 619 may collectively represent a single load or multiple loads. The "a," "b," and "c" load components 615, 617, 619 may also individually represent a single load or multiple loads. It is also understood that the load 114 is not limited to being three-phase equipment, i.e., equipment using each of the "a," "b," and "c" phase outputs 124, 126, 128 to operate. For example, each of the load components 615, 617, and 619 may represent single-phase loads (i.e., single-phase equipment). In other words, the "a," "b," and "c" phases 124, 126, 128 may be used together to power a three-phase device (e.g., a three-phase electric motor), or the "a," "b," and "c" phases 124, 126, 128 may be used to power a single-phase device (e.g., single-phase electric motors). Single-phase loads may be connected across any two phases for a line-to-line voltage (e.g, 208 VAC service) or between any one of the "a," "b," and "c" phases 124, 126, 128 and the neutral line 132 for a phase voltage (e.g., 120 VAC service).

In addition to the "a," "b," and "c" load components 615, 617, 619, the load 114, may also include an "n" neutral load component 621. The "n" neutral load component 621 may include an "n" designation throughout the description and drawings to identify the neutral load component 621 as neutral.

With reference again to FIG. 6, the full-bridge single-phase DC-AC inverter 592 includes the single-phase DC-AC inverter 122. The single-phase DC-AC inverter 122 includes the switching module 582. The switching module 582 includes switches 586, 588 and operates like the switching modules 576, 578, 580, described above, to convert a DC power input from the DC-DC converter 134 to an AC power. However, unlike the three-phase DC-AC inverter 118, the single-phase DC-AC inverter 122 is configured to output single-phase power, instead of the three-phase power output by the three-phase DC-AC inverter 118. The single phase DC-AC inverter may be used to power the single-phase load 116 (e.g., the "a" load component 615).

With reference again to FIGS. 3, 5, and 7, as described above, the electrical line or phase output from the single-phase DC-AC inverter 122 is designated as the "a" phase 130 or "a" line" from the single-phase DC-AC inverter 122. Here, "a" was chosen merely as an example and for the sake of convenience in describing the operation of the active neutral control circuit 301 and the role the single-phase DC-AC inverter 122 plays in balancing the output of the three-phase DC-AC inverter 118. Understandably, the operation of the single-phase DC-AC inverter 122 and how the "a" phase output 130 of the single-phase DC-AC inverter 122 interfaces with the "a" phase output 124 of the three-phase DC-AC inverter 118 to provide a balanced power output is not limited to the "a" phase outputs 124, 130. That is, the single-phase DC-AC inverter 122 may be configured in a different manner to apply the same balancing methodology to the "b" phase 126 or the "c" phase 128.

The power output from the single-phase DC-AC inverter 122 may flow via the "a" line 130 of the single-phase DC-AC inverter 122 to be injected as a floating reference voltage on a phase line linking the "a" line 124 of the three-phase DC-AC inverter 118 and the "n" neutral line 132.

With reference again to FIG. 6, the full-bridge single-phase DC-AC inverter 592 also includes the neutral leg 590. The neutral leg 590 includes the switching module 584. The switching module 584 includes switches 586, 588 and operates like the switching modules 576, 578, 580, 582 described above to convert a DC power that is output from the DC-DC converter 134 to an AC power. The power that is output from the switching module 584 of the neutral leg 590 may flow via the neutral "n" line 132 to the "n" load component 621. The neutral leg 590 along with the "a" line 130 provides a true single-phase voltage $V_{ans}$ with correct magnitude and phase angle from among the three-phase line-to-line voltages $V_{ab}$, $V_{bc}$, $V_{ca}$. The neutral leg 590 also ensures that the three-phase line-to-neutral voltages $V_{an}$, $V_{bn}$, $V_{cn}$ are balanced—that is, nearly equal in magnitude with a 120° phase offset from one another. The active neutral balancing provided by the full-bridge single-phase DC-AC inverter 592 endeavors to minimize neutral load currents by dynamically redistributing the neutral load currents among the "a," "b," and "c" phases to maintain balance. Reducing the neutral current in the balanced power conversion system

300: reduces power losses and limits and/or prevents overloading the circuits of the balanced power conversion system 300; improves the efficiency of the balanced power conversion system 300 by preventing the individual phases 124, 126, 128, active components, and the power electronics (e.g., DC-DC converter 134, switches 586, 588) in the balanced power conversion system 300 from taking a majority of the load; and stabilizes the circuits of the balanced power conversion system 300 by minimizing voltage fluctuations.

Because the switches 586, 588 in the neutral leg 590 are active switches, and because the full-bridge single-phase DC-AC inverter 592 is configured as a full, single-phase bridge, these configurations allow for a bidirectional flow of power to and from the DC power source 110 and the full-bridge single-phase DC-AC inverter 592 of the DC-AC inverter 112 via the DC-DC converter 134.

With reference to FIGS. 5 and 6, the ON-OFF switching of the switching modules 582 and 584 of the full-bridge single-phase DC-AC inverter 592 may be controlled by PWM signals output from the single-phase PWM generator 370. The ON-OFF switching of the switching modules 582, 584 in the full-bridge single-phase DC-AC inverter 592 may help to balance neutral currents of the "n" load component in addition to balancing the phase voltages of the power supplied to the load 114 by the three-phase DC-AC inverter 118.

With reference again to FIG. 3, the balanced power conversion system 300 includes the three-phase voltage sensors 352. With reference now to FIGS. 5 and 7, the three-phase voltage sensors 352 in FIG. 3 are a plurality of voltage sensors including a $V_{ca}$ voltage sensor 623, a $V_{ab}$ voltage sensor 625, and a $V_{bc}$ voltage sensor 627. The $V_{ca}$ voltage sensor 623 is disposed between the "a" phase line 124 and the "c" phase line 128 and is configured to sense the line (i.e., line-to-line) voltage between the "a" phase line 124 and the "c" phase line 128 for the three-phase power output by the three-phase DC-AC inverter 118. The $V_{ab}$ voltage sensor 625 is disposed between the "a" phase line 124 and the "b" phase line 126 and is configured to sense the line voltage between the "a" phase line 124 and the "b" phase line 126 for the three-phase power output by the three-phase DC-AC inverter 118. The $V_{bc}$ voltage sensor 627 is disposed between the "b" phase line 126 and the "c" phase line 128 and is configured to sense the line voltage between the "b" phase line 126 and the "c" phase line 128 for the three-phase power output by the three-phase DC-AC inverter 118. The voltages sensed or measured by each of the $V_{ca}$, $V_{ab}$, and $V_{bc}$ voltage sensors 623, 625, 627 may be output as signals from the respective sensors and used, for example, by a controller as the basis for controlling component in the balanced power conversion system 300.

With reference to FIGS. 3 and 5, the balanced power conversion system 300 further includes the three-phase controller 354. As a non-limiting example, the three-phase controller 354 may be a type of feedback controller that compares input values against other values to manipulate the output of the three-phase controller 354 to a desired value. For example, the three-phase controller 354 may be a proportional controller with proportional control capabilities, a proportional-integral (PI) controller with proportional and integral control capabilities, or a proportional-integral-derivative (PID) controller with proportional, integral, and derivative control capabilities.

In one example embodiment, the three-phase controller 354 is a PI controller that compares the measured voltage signals output from the $V_{ca}$, $V_{ab}$, and $V_{bc}$ voltage sensors

623, 625, 627 against reference voltage values generated by the three-phase reference voltage generator 356. The measured voltage signals output from the $V_{ca}$, $V_{ab}$, and $V_{bc}$ voltage sensors 623, 625, 627 may be respectively input into the three-phase controller 354 via signal lines 629, 631, 633. The reference voltage signals from the three-phase reference voltage generator 356 may be input into the three-phase controller 354 via a reference signal line 635. Although the reference signal line 635 is illustrated in FIG. 5 as a single line, the reference signal line 635 may be configured to be multiplexed to input a plurality of different voltage reference signals output from the three-phase reference voltage generator 356 via a single line to the three-phase controller 354.

In an example embodiment using a PI controller for the three-phase controller 354, the voltage reference signals output from the three-phase reference voltage generator 356 may be the desired process variable or setpoint, while the voltage signals output from the $V_{ca}$, $V_{ab}$, and $V_{bc}$ voltage sensors 623, 625, 627 are the measured process variables. The three-phase controller 354 may compare the desired process variables against the measured process variables to output control variables (i.e., control signals) from the three-phase controller 354.

The three-phase controller 354 may output a plurality of control signals via a three-phase control signal line 637. The three-phase control signal line 637 may be a multiplexed line configured to carry a plurality of different control signals via a single line. Alternatively, the control signal line 637 may include a plurality of lines, for example three lines, with each line dedicated to carrying a specific control signal output from the three-phase controller 354. The control signals output from the three-phase controller 354 and carried by the three-phase control signal line 637 may be input into the three-phase PWM generator 358 and used as the basis for generating PWM control signals.

The three-phase PWM generator 358 is configured to use the control signals output from the three-phase controller to generate a plurality of PWM signal outputs for controlling the ON-OFF switching of the switches 586, 588 in each of the switching modules 576, 578, 580 in the three-phase DC-AC inverter 118. The PWM signals from the three-phase PWM generator 358 may be output to the switching modules 576, 578, 580 via a three-phase PWM signal line 639. The three-phase PWM signal line 639 may be an individual, multiplexed line that is configured to carry a plurality of signals output from the three-phase PWM generator 358 to each respective switching module 576, 578, 580, or configured as a plurality of separate lines configured to carry a specific PWM output signal from the three-phase PWM generator 358 for each of the switching modules 576, 578, 580.

As described above, the PWM control signals output from the three-phase PWM generator 358 control the ON-OFF switching of the switching modules 576, 578, 580 in the three-phase DC-AC inverter 118. By controlling the switches 586, 588 in each of the switching modules 576, 578, 580, each switching module 576, 578, 580 can convert the DC voltage of the DC power output from the DC-DC converter 134 to an AC voltage having a square, sinusoidal, or modified sine wave form. The AC waveform can then be further processed (e.g., smoothed by LC circuit) to produce or approximate a sinusoidal waveform of an AC voltage in instances where the initial AC waveform is not sinusoidal. The PWM signal from the PWM generator 358 can also be used to control the amplitude (i.e., magnitude of the voltage) and frequency of the AC voltage output from the switching modules 576, 578, 580. The PWM signal control from the PWM generator can also help to reduce lower-order harmonics in the AC voltages output from the switching modules 576, 578, 580 of the three-phase DC-AC inverter 118.

With reference again to FIG. 7, in addition to the voltage sensors 572, 623, 625, 627, the balanced power conversion system 300 may include a plurality of current sensors in electrical connection to the "a," "b," "c," and "n" lines 124, 126, 128, 130, 132 to sense or measure current flowing in these lines. For example, the "a" line current sensor 641 is configured to measure a current flowing in the "a" line 124, the "b" line current sensor 643 is configured to measure a current flowing in the "b" line 126, and the "c" line current sensor 645 is configured to measure a current flowing in the "c" line 128.

The "a" line of the three-phase-to-neutral current sensor 647 is configured to measure current flowing from the "a" line 124 to the "n" line 132. The "b" line of the three-phase-to-neutral current sensor 649 is configured to measure current flowing from the "b" line 126 to the "n" line 132. The "c" line of the three-phase-to-neutral current sensor 651 is configured to measure current flowing from the "c" line 128 to the "n" line 132.

The "a" line of the single-phase-to neutral current sensor 653 is configured to measure current flowing from the "a" line 130 of the single-phase inverter 122 to the "n" line 132. The neutral line current sensor 655 is configured to measure current flowing in the "n" line 132.

The current sensors 574, 641, 643, 645, 647, 649, 651, 653, 655 may be Hall effect sensors (i.e., Hall sensors). The current sensors 574, 641, 643, 645, 647, 649, 651, 653, 655 may also be electrically connected to controllers (e.g., the three-phase controller 354, the single-phase controller 368) (connection wiring not shown). The current sensors 574, 641, 643, 645, 647, 649, 651, 653, 655 may be used to measure current and can be used in conjunction with the voltage sensors (e.g., voltage sensors 364, 572, 623, 625, 627, 675) and the voltages measured by the voltage sensors to calculate a power flow throughout the circuit(s) of the balanced power conversion system 300, in addition to ensuring that the currents flowing throughout the balanced power conversion system 300 are within the rated limits. The current sensors 574, 641, 643, 645, 647, 649, 651 may be used to provide feedback to the controllers 354, 368, or more specifically the control algorithms of the controllers, to actively balance the loads 615, 617, 619, 621 of the phase and neutral lines 124, 126, 128, 132, to ensure the balanced power conversion system 300 is a balanced system.

The current sensors 647, 649, 651, 653 in proximity to capacitors 605, 609, 613, 659 may also be used as the basis for calculating other variables that can be used for control purposes. For example, the current sensor 653 may measure current in the single-phase "a" line 130 and be used in conjunction with the capacitor 659 to calculate the rate of change of voltage on the capacitor 659 with respect to time, as calculated by Equation 10 below. The current when charging the capacitor 659 is based on the rate of change in voltage (i.e., ΔV) over the change in time (i.e., Δt) or dV/dt. Using Equation 10, the current (I) can be measured by the current sensor 653. Since the capacitance (C) of the capacitor 659 is a known value, the rate of change of voltage with respect to time (dV/dt) on the capacitor 659 can be calculated by dividing the current (I) by the capacitance (C).

$$I = C \frac{dV}{dt}$$ (Equation 10)

The current sensors 647, 649, 651, 653 measuring current in proximity to capacitors 605, 609, 613, 659 may also be used to measure harmonic currents (i.e., harmonic distortion). By measuring/monitoring the harmonic currents, the controllers 354, 358, 368, 370 can better tailor the outputs of the inverter 112 to mitigate the effects of harmonic distortion on the balanced power conversion system 300.

In addition to the full-bridge single phase DC-AC inverter 592, the active neutral control circuit 301 of the balanced power conversion system 300 may also include the single-phase LC filter 360, as shown in FIG. 3. With reference to FIG. 7, the single-phase LC filter 360 for the "a" phase output 130 of the single-phase DC-AC inverter includes an inductor 657 and a capacitor 659. The inductor 657 and capacitor 659 may be collectively referred to as the single-phase LC filter 360, e.g., as shown in FIG. 3. The single-phase LC filter 360 may be used to smooth the output AC waveforms of the "a" line/phase output of the single-phase DC-AC inverter 122, in addition to filtering certain frequency components of the output AC waveforms. That is, for any square- or modified sine waves output by the single-phase DC-AC inverter 122, the single-phase LC filter 360 may help to smooth these waveforms into more sinusoidal-shaped waveforms.

With reference to FIGS. 3 and 7, the active neutral control circuit 301 may also include the resistor 362. The resistor 362 is disposed between the output of the single-phase DC-AC inverter 122 and an interconnecting wire 661 that connects the "a" phase output line 124 from the three-phase DC-AC inverter 118 to the neutral "n" line 132.

The interconnecting wire 661 is a phase line of the three-phase DC-AC inverter 118. In an example embodiment, the interconnecting wire 661 carries the "a" phase voltage $V_{an}$ (i.e., the "a" line-to-neutral voltage). The phase line 661 is not limited to being a phase line for the "a" phase voltage from the three-phase DC-AC inverter 118 but may be configured to be, for example, the phase line for the "b" phase or the "c" phase.

The resistor 362 is the intermediary electrical component between the "a" line output 130 that carries the $V_{ans}$ voltage output from the single-phase inverter 122, and the "a" line output 124 and the interconnecting wire 661 that carries the $V_{an}$ phase voltage derived from the "a" phase component output by three-phase DC-AC inverter 118. The resistor 362 has a high resistance value and is configured to reduce any current in the output of the single-phase DC-AC inverter 122 to a negligible value. The resistor 362 functions to bring the potential of the output from the single-phase DC-AC inverter 122 on the "a" line 130 and the potential of the "a" phase output 124 of the three-phase DC-AC inverter 118 to be at the same reference potential. Without the resistor 362, the single-phase AC voltage from the single-phase DC-AC inverter 122 will still be sinusoidal with the correct voltage and phase angle. However, this single-phase AC voltage will be isolated and separate from the "a" phase voltage of the "a" phase 124 of the three-phase DC-AC inverter 118 without the resistor 362. In an example embodiment, the resistor 362 may virtually eliminate all current from the output of the single-phase DC-AC inverter 122 so that the output voltage $V_{ans}$, after passing through the resistor 362, acts as a floating reference voltage to the $V_{an}$ "a" phase voltage derived from the three-phase output of the three-phase DC-AC inverter 118. In a non-limiting example, the resistance value of the resistor 362 is around 10 megaohms (i.e., 10 MΩ).

With reference to FIGS. 3, 5, and 7, the active neutral control circuit 301 also includes a single-phase voltage sensor 364. The single-phase voltage sensor 364 may be disposed on the interconnecting wire 661 between the resistor 362 and the "n" wire 132. The single-phase voltage sensor 364 is configured to measure the $V_{ans}$ voltage output by the single-phase DC-AC inverter 122 and to output the measurement as a single-phase voltage signal $V_{ans}$. The single-phase voltage sensor 364 outputs the single-phase voltage signal $V_{ans}$ to a single-phase voltage signal line 663. In an exemplary embodiment, the single-phase voltage sensor 364 is configured to measure the "a" phase voltage $V_{ans}$ and to output the single-phase voltage signal $V_{ans}$ via the single-phase voltage signal line 663 to the single-phase controller 368.

With reference again to FIG. 3, the active neutral control circuit 301 includes the wye (i.e., "Y") circuit 366. With reference now to FIGS. 5 and 7, the wye circuit 366 is a balanced, three-phase resistive load bank including a first resistor 665, a second resistor 667, and a third resistor 669, wherein the first, second, and third resistor are interconnected by an "n" neutral point 671. The wye circuit 366 is configured to be balanced such that the first resistor 665, the second resistor 667, and the third resistor 669 all have the same resistance. The resistive value for the first resistor 665, second resistor 667, and the third resistor 669 is high enough so there is little or nominal power loss of the power flowing through the wye circuit 366. As a non-limiting example, the resistive value of the first, second, and third resistors 665, 667, 669 may be 1 MΩ.

The first resistor 665 is configured to be a resistive component for power from the "a" line 124, the second resistor 667 is configured to be a resistive component for power from the "b" line 126, and the third resistor 669 is configured to be a resistive component for power from the "c" line 128.

Each of the first resistor 665, the second resistor 667, and the third resistor 669 is a two-terminal electrical component with one of the terminals of each of the resistors 665, 667, 669 electrically connected to a respective output phase 124, 126, 128 of the three-phase power output (e.g., the three-phase DC-AC inverter 118) and the other terminal electrically connected to the terminals of the other resistors 665, 667, and 669 to form the "n" neutral point 671.

Figure 8:
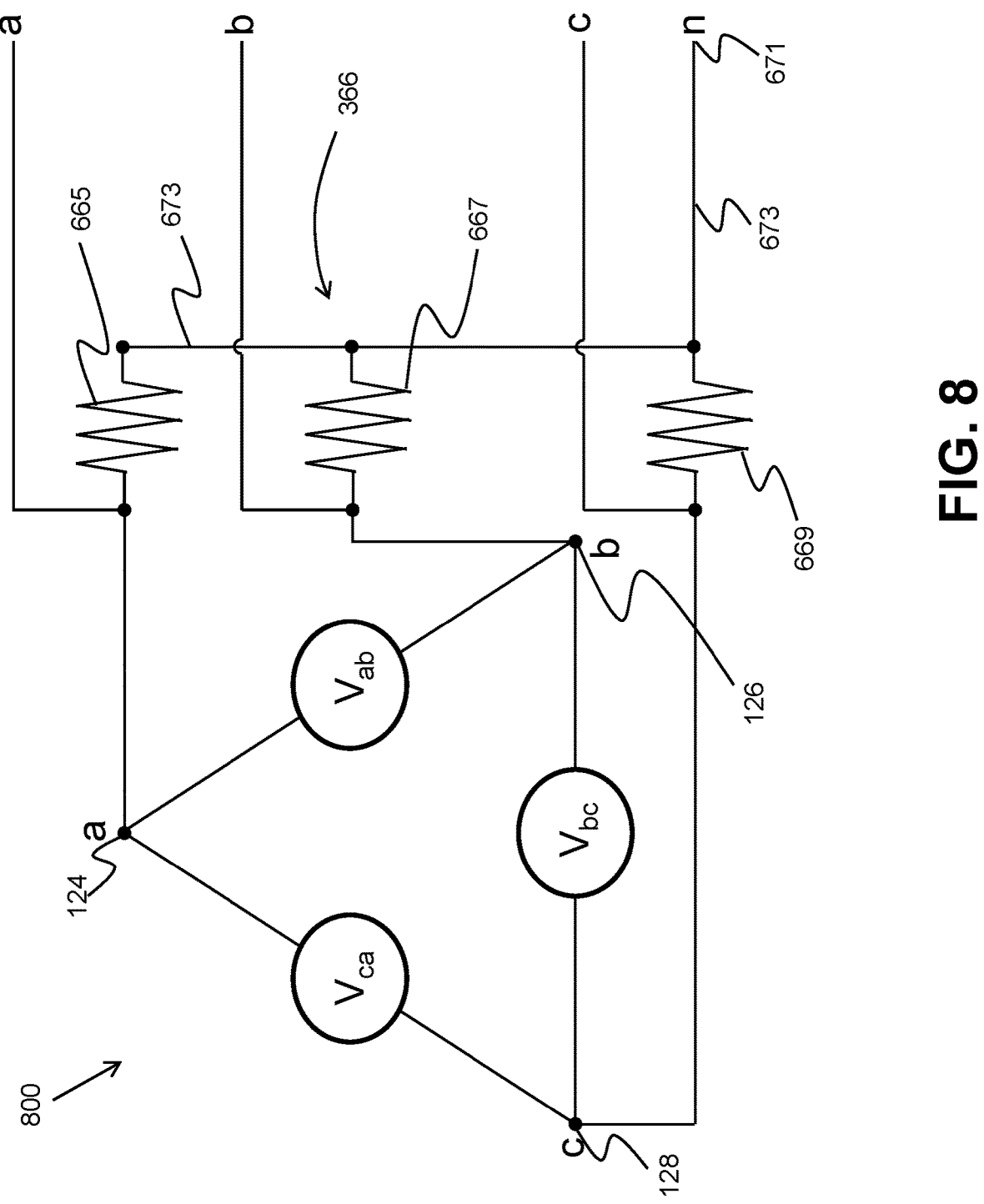
FIG. 8 illustrates an example delta arrangement of a three-phase power output including a neutral line.
Figure 9:
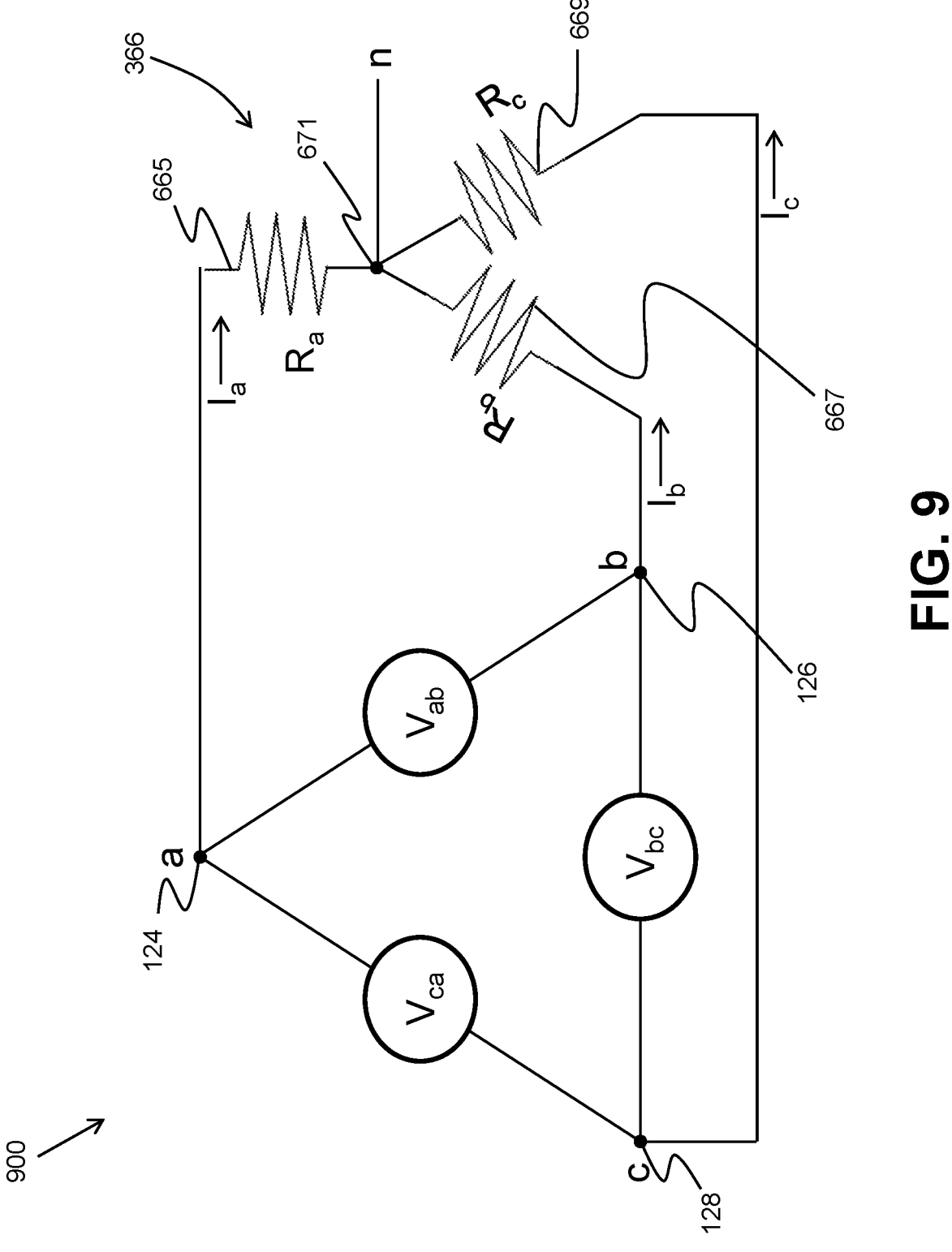
FIG. 9 illustrates an example wye arrangement of a three-phase power output including a neutral point.

With reference now to FIGS. 8 and 9, exemplary models 800, 900 of the wye circuit 366 with the "n" neutral point 671 are illustrated. In FIGS. 8 and 9, the "a," "b," and "c" phase outputs 124, 126, 128 from the three-phase DC-AC inverter 118 are arranged in a delta formation. One terminal of the first, second, and third resistors 665, 667, 669 are connected respectively to the "a," "b," and "c" phase outputs 124, 126, 128.

In FIG. 8, the wye circuit model 800 has the other terminals of the first, second, and third resistors 665, 667, 669 are electrically connected via an "n" neutral wire 673. The "n" neutral point 671 may be an arbitrary point along the "n" neutral wire 673.

In FIG. 9, the wye circuit model 900 is an equivalent arrangement to the arrangement in FIG. 8 where the first, second, and third resistors 665, 667, 669 are arranged in a wye (i.e., Y) configuration (i.e., wye circuit 366) where one terminal of the resistors 665, 667, 669 are respectively connected to the "a," "b," and "c" phase outputs 124, 126, 128, and the other terminals of the resistors 665, 667, 669 are connected together to form the "n" neutral point 671. In FIG. 9, the current flow of the "a," "b," and "c" phases 124, 126, 128 are shown respectively as $I_a$, $I_b$, and $I_c$ with directional arrows to indicate the directional flow of current. In FIG. 9, the resistance value of the first resistor 665 is indicated as $R_a$, the resistance value of the second resistor 667 is indicated as $R_b$, and the resistance value of the third resistor 669 is indicated as $R_c$. As described above, since the resistance values of $R_a$, $R_b$, and $R_c$ are equal, the resistance value for the resistors 665, 667, 669 may be given as R.

With reference again to FIGS. 3, 5, and 7, the wye circuit 366 may also include a wye circuit voltage sensor 675. The wye circuit voltage sensor 675 may be disposed between the "n" neutral point 671 and the "n" neutral wire 132. The wye circuit voltage sensor 675 is configured to measure a phase voltage (i.e., line-to-neutral voltage) for one of the "a," "b," and "c" phases output from the three-phase DC-AC inverter 118 with respect to the "n" neutral point 671 and to output the corresponding measured voltage as a wye circuit voltage signal—that is, a neutral point voltage signal. The phase voltage of one of the "a," "b," and "c" phases output from the three-phase DC-AC inverter 118 may be used by the active neutral control circuit 301 as a reference voltage.

In an exemplary embodiment, the wye circuit voltage sensor 675 measures the "a" phase voltage output from the three-phase DC-AC inverter 118, after passing through the wye circuit 366, as the wye circuit voltage signal $V_{any}$. The wye circuit voltage signal $V_{any}$ is the "a" phase voltage used by the active neutral control circuit 301 as a reference phase voltage. As described above, the "a" line-to-neutral voltage $V_{an}$, and the wye circuit voltage signal $V_{any}$ of the "a" phase output are described throughout the specification as example signals/measurements to describe the operation of the active neutral control circuit 301. However, the operation of the active neutral control circuit 301 is not limited to the "a" line-to-neutral voltage signal $V_{an}$ and the wye circuit voltage signal $V_{any}$. That is, a skilled artisan would understand that measured voltage signals from the other phases (e.g., "b" and "c") may be used for the operation of the active neutral control circuit 301.

With reference again to FIG. 5, a wye circuit signal line 677 is electrically connected to the wye circuit voltage sensor 675 and the wye circuit signal line 677 is configured to carry the wye circuit voltage signal (e.g., the wye circuit voltage signal $V_{any}$) output from the wye circuit voltage sensor 675 to the single-phase controller 368.

The active neutral control circuit 301 also includes the single-phase controller 368. As a non-limiting example, the single-phase controller 368 may be a type of feedback controller that compares input values against other values to manipulate the output of the single-phase controller 368 to a desired value. For example, the single-phase controller 368 may be a proportional controller with proportional control capabilities, a proportional-integral (PI) controller with proportional and integral control capabilities, or a proportional-integral-derivative (PID) controller with proportional, integral, and derivative control capabilities.

The single-phase controller 368 is electrically connected to both the single-phase voltage sensor 364 via the single-phase voltage signal line 663 and the wye circuit voltage sensor 675 via the wye circuit signal line 677. The single-phase controller 368 is configured to input, for example, both the "a" line-to-neutral voltage signal $V_{ans}$ from the single-phase DC-AC inverter 122 and the wye circuit voltage signal $V_{any}$.

In one example embodiment, the single-phase controller 368 is a PI controller that compares the measured voltage signal $V_{an}$ from the single-phase voltage sensor 364 against the reference wye circuit voltage signal $V_{any}$. In this example, the reference wye circuit voltage signal $V_{any}$ may be the desired process variable or setpoint, while the measured single-phase voltage signal $V_{an}$ from the single-phase voltage sensor 364 is the measured process variable. The single-phase controller 368 may compare the desired process variable against the measured process variable to output one or more control variables (i.e., control signals) from the single-phase controller 368 to a single-phase control signal line 679. The single-phase control signal line 679 is configured to carry the control signal from the single-phase controller 368 to the single-phase PWM generator 370.

The single-phase PWM generator 370 is configured to use the control signals output from the single-phase controller 368 to generate PWM control/output signals for controlling the ON-OFF switching of the switches 586, 588 in each of the switching modules 582, 584 in the full-bridge single-phase DC-AC inverter 592. The PWM control signals from the single-phase PWM generator 370 may be output to the switching modules 582, 584 via a single-phase PWM signal line 681. The single-phase PWM signal line 681 may be an individual, multiplexed line configured to carry a plurality of signals output from the single-phase PWM generator 370 to each respective switching modules 582, 584, or the single-phase PWM signal line 681 may be configured as a plurality of separate lines with each of the separate lines carrying a specific PWM signal from the single-phase PWM generator 370 to the intended switching modules 582, 584.

As described above, the PWM control signals that are output from the single-phase PWM generator 370 control the ON-OFF switching of the switching modules 582, 584 in the full-bridge single-phase DC-AC inverter 592. By controlling the switches 586, 588 in each of the switching modules 582, 584, each switching module 582, 584 converts the DC voltage of the DC power output from the DC-DC converter 134 to an AC voltage having a square, sinusoidal, or modified sine waveform. The PWM signal from the single-phase PWM generator 370 can also be used to control the amplitude (i.e., magnitude of the voltage) and frequency of the AC voltage that is output from the switching modules 582, 584. The PWM control signal from the PWM generator can also help to reduce lower-order harmonics in the AC voltages output from the switching modules 582, 584 of the full-bridge single-phase DC-AC inverter 592.

Using the PWM signals output from the single-phase PWM generator 370, the full-bridge single-phase inverter 592 outputs the "a" phase voltage $V_{ans}$ as a floating reference voltage to balance the phase voltage $V_{an}$ from the three-phase DC-AC inverter 118. However, more than just the phase voltage $V_{an}$ alone is balanced due to the symmetrical nature of the three-phase system in the balanced power conversion system 300. In a floating reference system, balancing the voltage in one phase (e.g., $V_{an}$) implies equal loading and distribution of power. Balancing the phase voltage $V_{an}$ leads to automatically balancing the other phase voltages (i.e., $V_{bn}$, $V_{cn}$) derived from the output of the three-phase DC-AC inverter 118. In other words, balancing the phase voltage $V_{an}$ by using the output $V_{ans}$ from the single-phase DC-AC inverter 122 automatically leads to the balancing of the of the phase voltage $V_{bn}$ and $V_{cn}$ based on electrical circuit theory for balanced, three-phase wye-configured circuits. In this manner, the active neutral control circuit 301 can correct (i.e., balance) any unbalanced phase voltages in the set of phase voltage from the DC-AC inverter 118. For example, the active neutral control circuit can balance the unbalanced phase voltages $V_{an}$ 244b, $V_{bn}$ 246b, and $V_{cn}$ 248b, shown in FIG. 2B, so that the set of phase voltages are balanced like the set of balanced phase voltages $V_{an}$ 244a, $V_{bn}$ 246a, and $V_{cn}$ 248a, as shown in FIG. 2A.

With reference again FIG. 9, active neutral balancing by the wye circuit 366 is achieved when the first, second, and third resistors 665, 667, 669 all have the same value. As described above, given that the first, second, and third resistors 665, 667, 669 all have the same resistance value R, then:

$$V_{an} = I_a R \qquad \text{(Equation 11)}$$

$$V_{bn} = I_b R \qquad \text{(Equation 12)}$$

$$V_{cn} = I_c R \qquad \text{(Equation 13)}$$

As described above, the "n" neutral point 671 will carry no current if the load is balanced since the vector sum of all three phase currents $I_a$, $I_b$, $I_c$ at the neutral point 671 is zero. Thus:

$$I_a + I_b + I_c = 0 \qquad \text{(Equation 14)}$$

Substituting Equations 11, 12, and 13 respectively into Equations 7, 8, and 9 yields:

$$V_{ab} = I_a R - I_b R \qquad \text{(Equation 15)}$$

$$V_{bc} = I_b R - I_c R \qquad \text{(Equation 16)}$$

$$V_{ca} = I_c R - I_a R \qquad \text{(Equation 17)}$$

Substituting $I_c$ from Equation 14 into Equation 16:

$$V_{bc} = I_a R + 2I_b R \qquad \text{(Equation 18)}$$

Such that:

$$V_{bc} - V_{ab} = 3I_b R \qquad \text{(Equation 19)}$$

Or rearranging Equation 19:

$$I_b = \frac{(V_{bc} - V_{ab})}{3R} \qquad \text{(Equation 20)}$$

Thus substituting Equation 20 into Equation 12:

$$V_{bn} = \frac{(V_{bc} - V_{ab})}{3} \qquad \text{(Equation 21)}$$

Given the equations above, $V_{an}$ and $V_{cn}$ can be solved for in a similar manner such that:

$$V_{an} = \frac{(V_{ab} - V_{ca})}{3} \qquad \text{(Equation 22)}$$

$$V_{cn} = \frac{(V_{ca} - V_{bc})}{3} \qquad \text{(Equation 23)}$$

In the above equations, no assumptions were made about their nature, and the quantities given could be instantaneous or phasor quantities.

Equation 22 is a vectorial evaluation of $V_{an}$. So if $V_{ab}$ is assumed to be at a phase angle of 0°, then $V_{ca}$ will be at a phase angle of –240°. Hence, $V_{an}$ will have a magnitude of $(1/\sqrt{3})$ $|V_{ab}|$ at an angle of –30° relative to $V_{ab}$. In other words, $V_{an}$ will have a phase offset of –30° with respect to $V_{ab}$. In a similar manner, $V_{bn}$ and $V_{cn}$ will be respectively offset from $V_{bc}$ and $V_{ca}$ by a phase angle of –30° and have magnitudes of $(1/\sqrt{3})$ $|V_{ab}|$.

The equations above prove that if $V_{ab}$, $V_{bc}$, and $V_{ca}$ are balanced and the resistance values of the resistors 665, 667, 669 in the wye circuit 366 are identical, then the three phase voltages $V_{an}$, $V_{bn}$, and $V_{cn}$ will be equal in magnitude and be offset from one another with a phase angle of 120°. That is, by using one of the line-to-neutral voltages (i.e., phase voltages) in the balanced power conversion system 300 with the active neutral control circuit 301 and fixing it to some value, then all three phase voltages of the balanced power conversion system 300 with the active neutral control circuit 301 will have the same magnitude and be offset from one another by a phase angle of 120°. The validity of the equations above are based on the resistance values of the resistors 665, 667, 669 in the wye circuit 366 being identical.

While the balanced power conversion system 300 has been described above to include the active neutral control circuit 301, the active neutral control circuit 301 may be realized as a stand-alone circuit, for example, that may be added to a system with a three-phase power output, in addition to adding other components, to convert a system with a three-phase power output into the above-described balanced power conversion system 300. The three-phase power output is not limited to a three-phase inverter. For example, the three-phase power output my include a three-phase power source such as a three-phase generator. That is, the active neutral control circuit 301 described above may be adapted to be added to a three-phase power source for balancing the phase voltages from the three-phase power source.

In addition, while the three-phase controller 354, the three-phase PWM generator 358, the single-phase controller 368, and the single-phase PWM generator 370 are described above as separate components, these separate components may be realized by less components, such as single component combining the functionality of the three-phase controller 354, the three-phase PWM generator 358, the single-phase controller 368, and the single-phase PWM generator 370, or two components with one component combining the functionality of the three-phase controller 354 and the three-phase PWM generator 358, and another component combining the single-phase controller 368 and the single-phase PWM generator 370.

Figure 10:
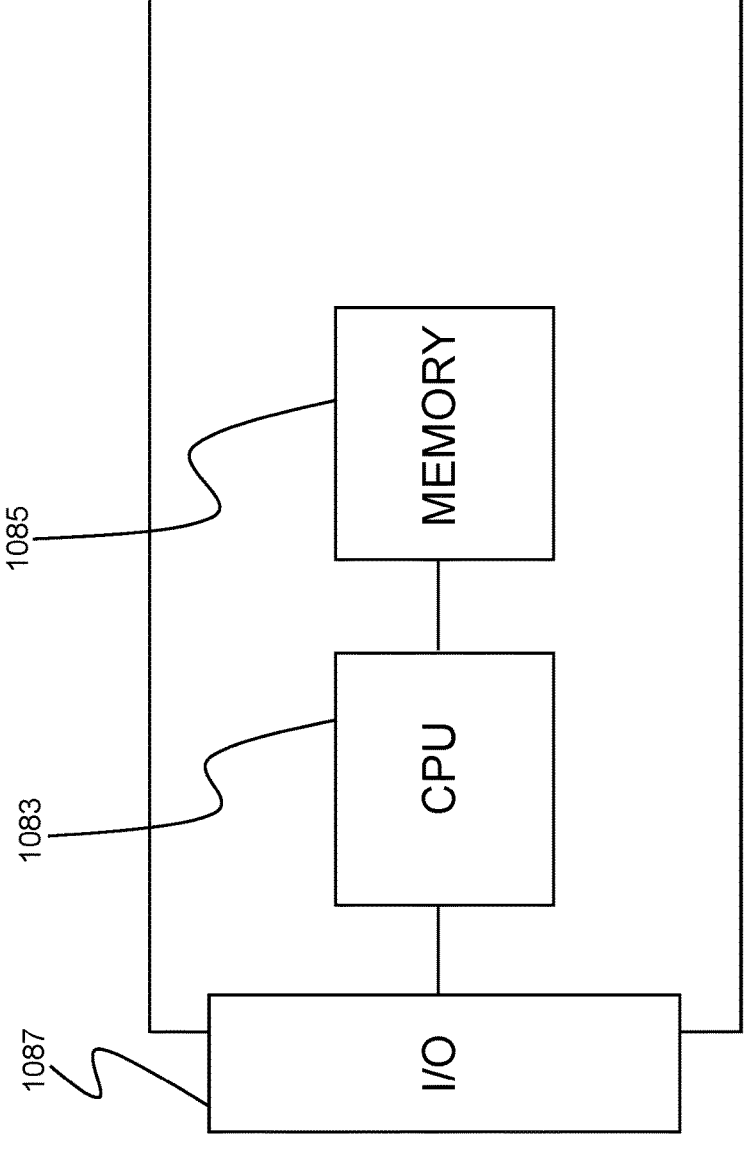
FIG. 10 illustrates an example schematic of a controller.

With reference now to FIG. 10, a singular controller 1000 is illustrated. The singular controller 1000 may be used alone or combined with a plurality of like controllers 1000 to provide the functionality of the three-phase controller 354, the three-phase PWM generator 358, the single-phase controller 368, and the single-phase PWM generator 370. For ease of description, the following description describes the function of a singular controller 1000, but as described above, a plurality of controllers may be used in place of a singular controller 1000. For example, a first controller 1000 may be used in place of the three-phase controller 354 and the three-phase PWM generator 358, and a second controller 1000 may be used in place of the single-phase controller 368 and the single-phase PWM generator 370.

As non-limiting examples, the controller 1000 may be a computer, a microcontroller, a digital signal processor (DSP), a system on a chip SoC, a field-programmable gate array (FPGA), an application-specific integrated circuit (ASIC), an integrated circuit (IC), or another specialized circuit with any combination of digital, analog, and logical circuit with any combination of digital, analog, and logical element hardware, in addition to software, programs, and instruction sets for controlling the hardware elements. In an example embodiment, the controller 1000 is a microcontroller.

The controller 1000 may include a CPU 1083 or like processor, in addition to including a memory 1085 and an input/output (I/O) 1087. The CPU 1083, the memory 1085, and the I/O 1087 may be electrically connected to another.

The CPU 1083 may be configured to execute a program/instruction set stored in the memory 1085 that, when executed, causes the CPU 1083 to perform the above-described functions associated with the three-phase controller 354, the three-phase PWM generator 358, the single-phase controller 368, and the single-phase PWM generator 370. In an example embodiment, the program instruction set in memory 1085, once executed by the CPU 1083, may cause the controller 1000 to perform a proportional-integral control and a PWM control.

The I/O 1087 may be configured to receive input signals from the signal lines 629, 631, 633, 635, 663, 667 and transfer the input signals to the CPU 1083 for processing. Likewise, the I/O 1087 may be configured to receive output signals from the CPU 1083 and to further output the output signals from the CPU 1083 to the signal lines 639, 681.

In operation, the CPU 1083 may execute a program/instruction set in the memory 1085 to instruct the I/O 1087 to transfer any received input signals to the CPU 1083 for processing. The executed program/instruction set may further instruct the CPU 1083 to process the received inputs to generate output signals and to transfer the output signals to the I/O 1087 for further output. The executed program/instruction set may further instruct the I/O 1087 to output the output signals to signal lines 639, 681 to further control the ON-OFF switching of the switches 586, 588 in the switching modules 576, 578, 580, 582, 584, so as to control the output of the three-phase DC-AC inverter 118 and the full-bridge single phase inverter 592 in the DC-AC inverter 112. As described above, such switching control of the 5-wire inverter 112 generates a floating reference voltage from the full-bridge single-phase inverter 592 to use as the basis for balancing the phase voltages derived from the three-phase AC power that is output from the three-phase DC-AC inverter 118.

Where a plurality of controllers 1000 are used, the inputs and outputs to the I/O 1087 may be arranged following the input/output scheme in the above description of the balanced power conversion system 300 and the active neutral control circuit 301. For example, where a second controller 1000 is used in place of the single-phase controller 368 and the single-phase PWM generator 370, the inputs to the I/O 1087 may include the $V_{ans}$ signal line 663 and the wye circuit signal line 677 and the outputs from the I/O 1087 may include the PWM output signal to the single-phase PWM signal line 681. In a like manner, the inputs and outputs to a first controller 1000 in a two controller arrangements may include the signals from signal lines 629, 631, 633, 635 and the three-phase PWM output signal to the three-phase PWM signal line 639. That is, based on the above description, a skilled artisan would understand how to modify the balanced power conversion system 300 to use a single controller 1000 or two or more controllers 1000 in place of the three-phase controller 354, the three-phase PWM generator 358, the single-phase controller 368, and the single-phase PWM generator 370.

With reference now to FIG. 11, a method S1100 for active neutral generation and balancing control of the phase voltages in a three-phase system is illustrated. As a non-limiting example, the method S1100 may be implemented with the active neutral control circuit 301 that is connected to a three-phase power source or three-phase power output (e.g., the three-phase DC-AC inverter 118), as described in the example embodiments above.

The method S1100 begins at block S1101, after a three-phase power is passed through a three-phase resistance bank (e.g., the resistors 665, 667, 669 in the wye circuit 366) where each resistor for each power phase is arranged to converge at a single neutral point (e.g., the "n" neutral point 671).

At block S1103, the phase voltage for one of the three phases is measured as a sinusoidal single-phase voltage signal at the neutral point. The measured sinusoidal single-phase voltage signal is a reference voltage signal (e.g., voltage $V_{any}$).

At block S1105, the reference voltage signal is input into a feedback controller (e.g., the single-phase controller 368) and compared against a variable voltage signal to generate and output a control signal.

At block S1107, the control signal from block S1105 is input into a PWM generator (e.g., the single-phase PWM generator 370) and used as the basis for generating a PWM control signal, and the PWM control signal is output from the PWM generator.

At block S1109, the PWM control signal generated at block S1107 is input to the power electronics components of a single-phase power generator or a device for outputting a single-phase power (e.g., the switching module 582 of the single-phase DC-AC inverter 122) and used as a basis for generating a single-phase AC power. A single-phase AC power is then generated and output.

At block S1111, the single-phase AC power output that is generated at block S1109 is smoothed to a sinusoidal waveform (e.g., by passing the single-phase AC power through the single-phase LC filter 360) and passed through a high-value resistor to substantially eliminate or reduce the current component of the waveform. After passing through the resistor, the single-phase AC voltage component of the waveform is a floating reference voltage that corresponds to the phase of the three-phase voltage measured at block S1103. Consequently, the single-phase AC voltage is output to the phase voltage line that corresponds to the phase measured at block S1103.

At block S1113, the single-phase AC voltage output and smoothed at blocks S1109 and S1111 is measured (e.g., by the single-phase voltage sensor 364) and output as a variable, single-phase voltage signal.

At block S1115, the variable single-phase voltage signal measured at block S1113 is input to the feedback controller described at block S1105 and compared against the reference single-phase voltage signal measured at block S1103 to generate and output a subsequent control signal for the PWM. Thus, after block S1115 the method returns to block S1107 and the subsequent control signal based on the result of the comparison between the variable single-phase voltage signal and the reference single-phase voltage signal is output to the PWM generator to generate a PWM control signal.

Thereafter, the generation of the PWM signal at block S1107, and the generation of the single-phase AC power at block S1109 are based on the subsequent results of the comparison between the variable single-phase voltage signal and the reference single-phase voltage signal, as calculated by the feedback controller, whereby the feedback controller generates the subsequent control signals so that the subsequent PWM signal and single-phase AC power are generated so that there is little to no error between the phase voltage of the one phase of the three-phase power output and the voltage of the single-phase power output.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and having" are inclusive and therefore specify the presence of stated features, integers, steps, operations, elements and/or components, but do not preclude the presence or addition of one or more other features, integers, steps, operations, elements, components, and/or groups thereof.

Where a plurality of like elements or features are described, ordinal descriptors may be used to distinguish the elements/features (e.g., first, second, third, fourth). Ordinal descriptors are not intended to be limiting. That is, the numbering of a feature in a claim does not imply that the same numbering of the feature is used in the description. For example, a first element recited in the claims does not imply that the first elements is referred to as "the first element" in the description. Rather, the element may have a different numbering in the description (e.g., "the second element").

The method steps, processes, and operations described herein are not to be construed as necessarily requiring their performance in the particular order discussed or illustrated, unless specifically identified as an order or performance. That is, it should be understood that one or more steps within a method may be executed in different order (or concurrently) without altering the principles of the present disclosure. It is also to be understood that additional or alternative steps may be employed.

Spatial and functional relationships between elements (for example, between modules, circuit elements, semiconductor layers, etc.) are described using various terms including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set. As used herein, the term "and/or" includes any and all combinations of one or more of the associated listed elements.

As used herein, the term "about" when used in conjunction with a number or measured value may mean ±10% of the number/value. In other words, "about 10" may mean from 9 to 11.

In the figures, the direction of an arrow, as indicated by the arrowhead, generally demonstrates the flow of information (such as data or instructions) that is of interest to the illustration. For example, when element A and element B exchange a variety of information but information transmitted from element to element B is relevant to the illustration, the arrow may point from element A to element B. This unidirectional arrow does not imply that no other information is transmitted from element B to element A. Further, for information sent from element A to element B, element B may send requests for, or send acknowledgement of receipt of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip (SoC).

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4. Controller Area Network (CAN) is also possible, using the J1939 SAE standard.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement that same functionality distributed by a load balancing system. In a further example, the functionality of the module may be split between a server (also known as a remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mas read-only memory circuit), volatile memory circuits (such as static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5$^{th}$ revision), Ada, ASP, (Active Server Pages), PHP (PHP: Hypertext Processor), Scala, Eiffel, Smalltalk, Erlang, Ruby, Flash®, Visual Basic®, Lua, MATLAB, SIMULINK, and Python®.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited and other modifications will become apparent upon a study of the drawings, the specification, and the following claims. Further, although each of the embodiments is described above as having certain features, any one or more of those features described with respect to any embodiment of the disclosure can be implemented in an/or combined with features of any of the other embodiments, even if that combination is not explicitly described. In other words, the described embodiments are not mutually exclusive, and permutations of one or more embodiments with one another remain within the scope of this disclosure.

What is claimed is:

1. An active neutral control circuit configured to connect to a three-phase AC power output having a first phase output, a second phase output, and a third phase output, the active neutral control circuit comprising:

a resistor bank configured to electrically connect to the first phase, second phase, and third phase outputs of the three-phase AC power output, and the resistor bank having a first resistor, a second resistor, and a third resistor converging to a neutral point, each of the first resistor, the second resistor, and the third resistor having two terminals, wherein one terminal of the first resistor is configured to connect to the first phase output of the three-phase AC power output and another terminal of the first resistor is connected to the neutral point, one terminal of the second resistor is configured to connect to the second phase out of the three-phase AC power output and another terminal of the second resistor is connected to the neutral point, and one terminal of the third resistor is configured to connect to the third phase output of the three-phase AC power output and another terminal of the third resistor is connected to the neutral point;

a first voltage sensor electrically connected to the neutral point and configured to sense an AC voltage of one of the first phase output, the second phase output, or the third phase output of the three-phase AC power output at the neutral point, and to output a neutral point voltage signal in response to sensing the AC voltage; and a controller electrically connected to the first voltage sensor and configured to input the neutral point voltage signal, to generate a PWM control signal based on the neutral point voltage signal, and to output the PWM control signal to a single-phase inverter, wherein the first voltage sensor is configured to output the neutral point voltage signal to the controller, and wherein the controller is further configured to electrically connect to the single-phase inverter.

2. The active neutral control circuit of claim 1, further comprising:

the single-phase inverter electrically connected to the controller and configured to connect to both (1) a DC power source or a DC power output and (2) a phase line of one of the first phase output, the second phase output, or the third phase output of the three-phase AC power output, the single-phase inverter having a switching module including a pair of power electronics switches, the single-phase inverter configured to input a DC power from the DC power source or the DC power output, to convert the DC power to a single-phase AC power having a single-phase AC voltage, and to output the single-phase AC power to the phase line of the one of the first phase, the second phase, or the third phase of the three-phase AC power output; and a second voltage sensor electrically connected to the controller and configured to connect to the phase line of the one of the first phase, the second phase, or the third phase of the three-phase AC power output, the second voltage sensor configured to sense a voltage of the single-phase AC power output by the single-phase inverter, and to output a single-phase voltage signal to the controller in response to sensing the voltage of the single-phase AC power.

3. The active neutral control circuit of claim 2, wherein the controller is further configured to compare the neutral point voltage signal to the single-phase voltage signal, to generate the PWM control signal based on a comparison of the neutral point voltage signal and the single-phase voltage signal, and to output the PWM control signal to a single-phase inverter.

4. The active neutral control circuit of claim 2, further comprising a fourth resistor having a pair of terminals, wherein one terminal of the fourth resistor is electrically connected an output to the single-phase inverter and another terminal of the fourth resistor is electrically connected to the second voltage sensor.

5. The active neutral control circuit of claim 4, further comprising an LC circuit having an inductor and a capacitor, the LC circuit electrically connected to, and disposed between, the single-phase inverter and the fourth resistor, and the LC circuit configured to smooth the single-phase AC voltage of the single-phase AC power output from the single-phase inverter.

6. A balanced power conversion system configured to connect to a DC power source, the balanced power conversion system comprising:

a DC-AC inverter configured to electrically connect to a DC power source or a DC power output, the DC-AC inverter including a three-phase DC-AC inverter configured to input a first DC power that is output from the DC power source or a second DC power that is output from the DC power output, to convert the first DC power or the second DC power to a three-phase AC power, and to output the three-phase AC power as a first phase output, a second phase output, and a third phase output, and a single-phase DC-AC inverter configured to input the first DC power or the second DC power, to convert the first DC power or the second DC power to a first single-phase AC power, and to output the first single-phase AC power; and an active neutral control circuit having a resistor bank electrically connected to the first, second, and third phase outputs of the three-phase DC-AC inverter, the resistor bank having a first resistor, a second resistor, and a third resistor converging to a neutral point, each of the first resistor, the second resistor, and the third resistor having two terminals, wherein one terminal of the first resistor is connected to the first phase output of the three-phase DC-AC inverter and another terminal of the first resistor is connected to the neutral point, and wherein one terminal of the second resistor is connected to the second phase output of the three-phase DC-AC inverter and another terminal of the second resistor is connected to the neutral point, and wherein one terminal of the third resistor is connected to the third phase output of the three-phase DC-AC inverter and another terminal of the third resistor is connected to the neutral point;

a first voltage sensor electrically connected to the neutral point and configured to sense an AC voltage of one of the first phase output, the second phase output, or the third phase output of the three-phase DC-AC inverter at the neutral point, and to output a neutral point voltage signal in response to sensing the AC voltage; and a first controller electrically connected to the first voltage sensor and the single-phase DC-AC inverter and configured to input the neutral point voltage signal, to generate a first PWM control signal based on the neutral point voltage signal, and to output the first PWM control signal to the single-phase DC-AC inverter, wherein the first voltage sensor is configured to output the neutral point voltage signal to the first controller.

7. The balanced power conversion system of claim 6, wherein the DC-AC inverter further includes a neutral leg electrically connected to a neutral line, the neutral leg configured to input the first DC power or the second DC power, to convert the first DC power or the second DC power to a second single-phase AC power, and to output the second single-phase AC power to the neutral line to balance neutral load currents on the neutral line, and wherein the balanced power conversion further comprises a phase line electrically connected to (1) the one of the first phase output, the second phase output, or the third phase output of the three-phase DC-AC inverter, (2) the single-phase DC-AC inverter, and (3) the neutral line, and wherein the active neutral control circuit further comprises a second voltage sensor electrically connected to the first controller and the phase line of the one of the first phase output, the second phase output, or the third phase output of the three-phase DC-AC inverter, and wherein the single-phase DC-AC inverter is further configured to output the single-phase AC power to the phase line, and wherein the second voltage sensor is configured to sense a voltage of the first single-phase AC power output by the single-phase inverter, and to output a single-phase voltage signal to the first controller in response to sensing the voltage of the first single-phase AC power.

8. The balanced power conversion system of claim 7, wherein the first controller is further configured to compare the neutral point voltage signal to the single-phase voltage signal, to generate the first PWM control signal based on a comparison of the neutral point voltage signal and the single-phase voltage signal, and to output the first PWM control signal to the single-phase inverter.

9. The balanced power conversion system of claim 7, wherein the active neutral control circuit further comprises a fourth resistor having a pair of terminals, wherein one terminal of the fourth resistor is electrically connected to the single-phase DC-AC inverter and another terminal of the fourth resistor is electrically connected to the second voltage sensor.

10. The balanced power conversion system of claim 9, wherein the active neutral control circuit further comprises an LC circuit having an inductor and a capacitor, the LC circuit electrically connected to, and disposed between, the single-phase inverter and the fourth resistor, and the LC circuit configured to smooth the single-phase AC voltage of the first single-phase AC power output from the single-phase inverter.

11. The balanced power conversion system of claim 6, further comprising the DC power output, wherein the DC power output is a DC-DC converter, and the DC-DC converter is configured to convert the first DC power that is output from the DC power source to the second DC power, and wherein the first DC power has a first DC voltage level, the second DC power has a second DC voltage level, and the first DC voltage level is higher than the second DC voltage level.

12. The balanced power conversion system of claim 6, wherein the three-phase DC-AC inverter includes a first switching module having a first pair of power electronics switches and configured to input the first DC power or the second DC power and to output the first phase output, a second switching module having a second pair of power electronics switches and configured to input the first DC power or the second DC power and to output the second phase output, a third switching module having a third pair of power electronics switches and configured to input the first DC power or the second DC power and to output the third phase output, and wherein the single-phase DC-AC inverter includes a fourth switching module having a fourth pair of power electronics switches and configured to input the first DC power or the second DC power and to output the first single-phase AC power.

13. The balanced power conversion system of claim 7, wherein the neutral leg includes a fifth switching module having a fifth pair of power electronics switches and configured to input the first DC power or the second DC power and to output the second single-phase AC power.

14. The balanced power conversion system of claim 6, further comprising:

a third voltage sensor electrically connected to the first phase output and the third phase output and configured to measure a first AC line-to-line voltage;

a fourth voltage sensor electrically connected to the first phase output and the second phase output and configured to measure a second AC line-to-line voltage;

a fifth voltage sensor electrically connected to the second phase output and the third phase output and configured to measure a third AC line-to-line voltage;

a second controller electrically connected to the third, fourth, and fifth voltage sensors and the three-phase DC-AC inverter; and a three-phase reference voltage generator electrically connected to the second controller, the three-phase reference voltage generator configured to generate a first reference AC voltage signal, a second reference AC phase voltage signal, and a third reference AC phase voltage signal, and wherein the second controller is configured to generate a second PWM signal, a third PWM signal, and a fourth PWM signal, and to output the second, third, and fourth PWM signals to the three-phase DC-AC inverter.

15. A method for active neutral generation and balancing of phase voltages in a three-phase power output, the method comprising:

passing each phase of a three-phase power output through one resistor in a three resistor bank, each resistor having one terminal connected to a different phase of the three-phase power output and another terminal connected to the other terminal of other resistors in the three resistor bank to form a neutral point;

measuring a phase voltage of one phase of the three-phase power output at the neutral point; and outputting the measured phase voltage as a reference voltage signal.

16. The method of claim 15, further comprising:

generating a PWM signal based on the reference voltage signal.

17. The method of claim 16, wherein the reference voltage signal is compared to a variable voltage signal to generate a control signal, and wherein the PWM signal is generated from the control signal.

18. The method of claim 16, further comprising:

inputting the PWM signal into a single-phase DC-AC inverter;

generating a single-phase AC power based on the PWM signal; and outputting the single-phase AC power to a phase line of the one phase of the three-phase power output.

* * * * *